US012160029B2

(12) United States Patent
Bae et al.

(10) Patent No.: US 12,160,029 B2
(45) Date of Patent: Dec. 3, 2024

(54) ANTENNA STRUCTURE AND ELECTRONIC DEVICE INCLUDING THE SAME

(71) Applicant: SAMSUNG ELECTRONICS CO., LTD., Suwon-si (KR)

(72) Inventors: Seyoon Bae, Suwon-si (KR); Yongyoun Kim, Suwon-si (KR); Sungsoo Kim, Suwon-si (KR); Byoungryoul Song, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 166 days.

(21) Appl. No.: 18/082,266

(22) Filed: Dec. 15, 2022

(65) Prior Publication Data

US 2023/0140862 A1 May 11, 2023

Related U.S. Application Data

(63) Continuation of application No. PCT/KR2022/017374, filed on Nov. 7, 2022.

(30) Foreign Application Priority Data

Nov. 8, 2021 (KR) .................. 10-2021-0152373

(51) Int. Cl.
*H01Q 1/24* (2006.01)
*H01Q 1/48* (2006.01)
*H01Q 1/52* (2006.01)

(52) U.S. Cl.
CPC ............ *H01Q 1/243* (2013.01); *H01Q 1/48* (2013.01); *H01Q 1/52* (2013.01)

(58) Field of Classification Search
CPC .......... H01Q 1/24; H01Q 1/242; H01Q 1/243; H01Q 1/52
See application file for complete search history.

(56) References Cited

U.S. PATENT DOCUMENTS 10,219,057 B2 * 2/2019 Luce ................... H04R 7/18
11,069,265 B2 7/2021 Jung et al.
(Continued)

FOREIGN PATENT DOCUMENTS

CN 210671188 U 6/2020
CN 113612873 A 11/2021
(Continued)

OTHER PUBLICATIONS

International Search Report and Written Opinion for International Application No. PCT/KR2022/017374; International Filing Date Nov. 7, 2022; Date of Mailing Feb. 20, 2023; 10 Pages.

*Primary Examiner* — Jason M Crawford

(74) *Attorney, Agent, or Firm* — CANTOR COLBURN LLP

(57) ABSTRACT

An electronic device includes a display module, and a side housing surrounding a side surface of the display module and formed of a conductive material. A protection member covers a part of the side housing and the display module. The protection member includes a first portion facing the display module and a second portion facing the side housing. A first conductive member is disposed in at least a part of the first portion of the protection member and is formed of a conductive material. A second conductive member is disposed in at least a part of the second portion of the protection member, is connected to the first conductive member, and is formed of a conductive material. A separation space is disposed between the second conductive member and the side housing, and an antenna is electrically connected to the side housing such that the side housing functions as an antenna.

20 Claims, 19 Drawing Sheets

(56) References Cited

U.S. PATENT DOCUMENTS

| | | | |
|---|---|---|---|
| 2013/0207853 A1 | 8/2013 | Yamamoto et al. | |
| 2015/0070622 A1 | 3/2015 | Christophy et al. | |
| 2016/0118713 A1* | 4/2016 | Hong | H01Q 9/0407 |
| | | | 343/702 |
| 2017/0048366 A1 | 2/2017 | Jeong | |
| 2018/0261907 A1 | 9/2018 | Ha et al. | |
| 2019/0027807 A1* | 1/2019 | Choi | H01Q 5/378 |
| 2020/0051468 A1* | 2/2020 | Jung | G06F 1/1616 |
| 2020/0153115 A1 | 5/2020 | Yun et al. | |
| 2020/0259243 A1* | 8/2020 | Jeon | H01Q 1/38 |
| 2021/0044029 A1 | 2/2021 | Yoon et al. | |
| 2021/0105894 A1* | 4/2021 | Oh | H05K 1/0281 |
| 2021/0143536 A1 | 5/2021 | Park et al. | |
| 2021/0152680 A1 | 5/2021 | Lee et al. | |
| 2021/0274658 A1* | 9/2021 | Park | G06F 1/1626 |
| 2022/0346241 A1* | 10/2022 | Sunwoo | H04M 1/0266 |
| 2022/0376401 A1* | 11/2022 | Khripkov | H01Q 1/2266 |
| 2023/0007108 A1* | 1/2023 | An | H01Q 5/364 |
| 2023/0051139 A1* | 2/2023 | Yeo | H05K 1/115 |
| 2023/0140862 A1* | 5/2023 | Bae | H01Q 1/44 |
| | | | 343/702 |
| 2023/0188173 A1* | 6/2023 | Yun | H04B 7/0602 |
| | | | 455/552.1 |
| 2023/0205276 A1* | 6/2023 | Oh | G06F 1/1652 |
| | | | 361/679.02 |
| 2023/0225066 A1* | 7/2023 | Park | G06F 1/1641 |
| | | | 361/807 |
| 2023/0229199 A1* | 7/2023 | Lee | G06F 1/1641 |
| | | | 361/679.27 |

FOREIGN PATENT DOCUMENTS

| | | |
|---|---|---|
| JP | 2012151710 A | 8/2012 |
| JP | 2013165409 A | 8/2013 |
| JP | 2020167546 A | 10/2020 |
| KR | 20170019973 A | 2/2017 |
| KR | 101861681 B1 | 5/2018 |
| KR | 20180054335 A | 5/2018 |
| KR | 20200018282 A | 2/2020 |
| KR | 20200053768 A | 5/2020 |
| KR | 20200128172 A | 11/2020 |
| KR | 20210017215 A | 2/2021 |
| KR | 20210056000 A | 5/2021 |
| KR | 20210058732 A | 5/2021 |

* cited by examiner

ANTENNA STRUCTURE AND ELECTRONIC DEVICE INCLUDING THE SAME

CROSS-REFERENCE TO RELATED APPLICATION(S)

This application is a continuation application, claiming priority under § 365(c), of an International Application No. PCT/KR2022/017374, filed on Nov. 7, 2022, which is based on and claims the benefit of a Korean patent application number 10-2021-0152373, filed on Nov. 8, 2021, in the Korean Intellectual Property Office, the disclosure of which is incorporated by reference herein in its entirety.

TECHNICAL FIELD

Various embodiments disclosed herein relate to an antenna structure and an electronic device including an antenna structure.

BACKGROUND ART

Electrostatic discharge (ESD) may occur between electronic components and electric elements made of conductive materials. ESD may refer to an electric phenomenon caused by an instantaneous movement of electric charge accumulated for various reasons to another part. An electronic component may experience ESD in response accumulating an electric charged inside and/or outside an electronic device. If an electronic component is subjected to ESD, which involves a strong voltage, the electronic component may be damaged. Such damage may cause the electronic device to malfunction or to have a degraded performance. In order to solve the problem of ESD, electric components included in an electronic device are connected to an electrically conductive path of flow to a ground reference included in the electronic device.

Meanwhile, electronic devices have a side housing configured to constitute the exterior thereof. The side housing can be connected to an antenna module, thereby using the same as an antenna. Due to the electronic device inside mounting structure, the ESD path is positioned adjacent to the side housing.

DISCLOSURE OF INVENTION

Technical Problem

An electronic device may have an electrostatic discharge (ESD) path formed such that static elasticity introduced from outside the electronic device into the electronic device flows to the ground included in the electronic device. The ESD path may be disposed adjacent to a side housing constituting the exterior of the electronic device and having an antenna function. In such a case, the antenna performance of the electronic device may be degraded by coupling between the side housing made of a conductive material and the ESD path.

Solution to Problem

Various embodiments disclosed herein may provide a scheme capable of improving the antenna performance even when the ESD path is disposed adjacent to the side housing. An electronic device according to various embodiments disclosed herein may include a display module, a side housing disposed to surround a side surface of the display module and formed of a conductive material, a protection member disposed to cover a part of the side housing and the display module, and including a first portion facing the display module and a second portion facing the side housing, a first conductive member disposed in at least a part of the first portion of the protection member and formed of a conductive material, a second conductive member disposed in at least a part of the second portion of the protection member, connected to the first conductive member, and formed of a conductive material, a separation space disposed between the second conductive member and the side housing, and an antenna electrically connected to the side housing such that the side housing functions as an antenna.

An antenna structure of an electronic device including a side housing configuring an exterior of the electronic device according to various embodiments disclosed herein may include an antenna integrated circuit (IC) connected to the side housing, a conductive member disposed on a protection member of the electronic device and formed of a conductive material, the protection member covering a part of the side housing, and a separation space disposed between the side housing and the conductive member.

Advantageous Effects of Invention

According to various embodiments disclosed herein, an ESD path may be disposed inside an electronic device such that at least a part thereof faces a side housing while being spaced apart from the side housing. A capacitance (C) may be generated between the ESD path and the side housing as the ESD path and the side housing face each other while being spaced apart. The capacitance (C) may be used appropriately to improve the antenna performance of the electronic device.

BRIEF DESCRIPTION OF DRAWINGS

In relation to the description of drawings, the same or similar reference numerals may be used for the same or similar components.

MODE FOR THE INVENTION

Figure 1:
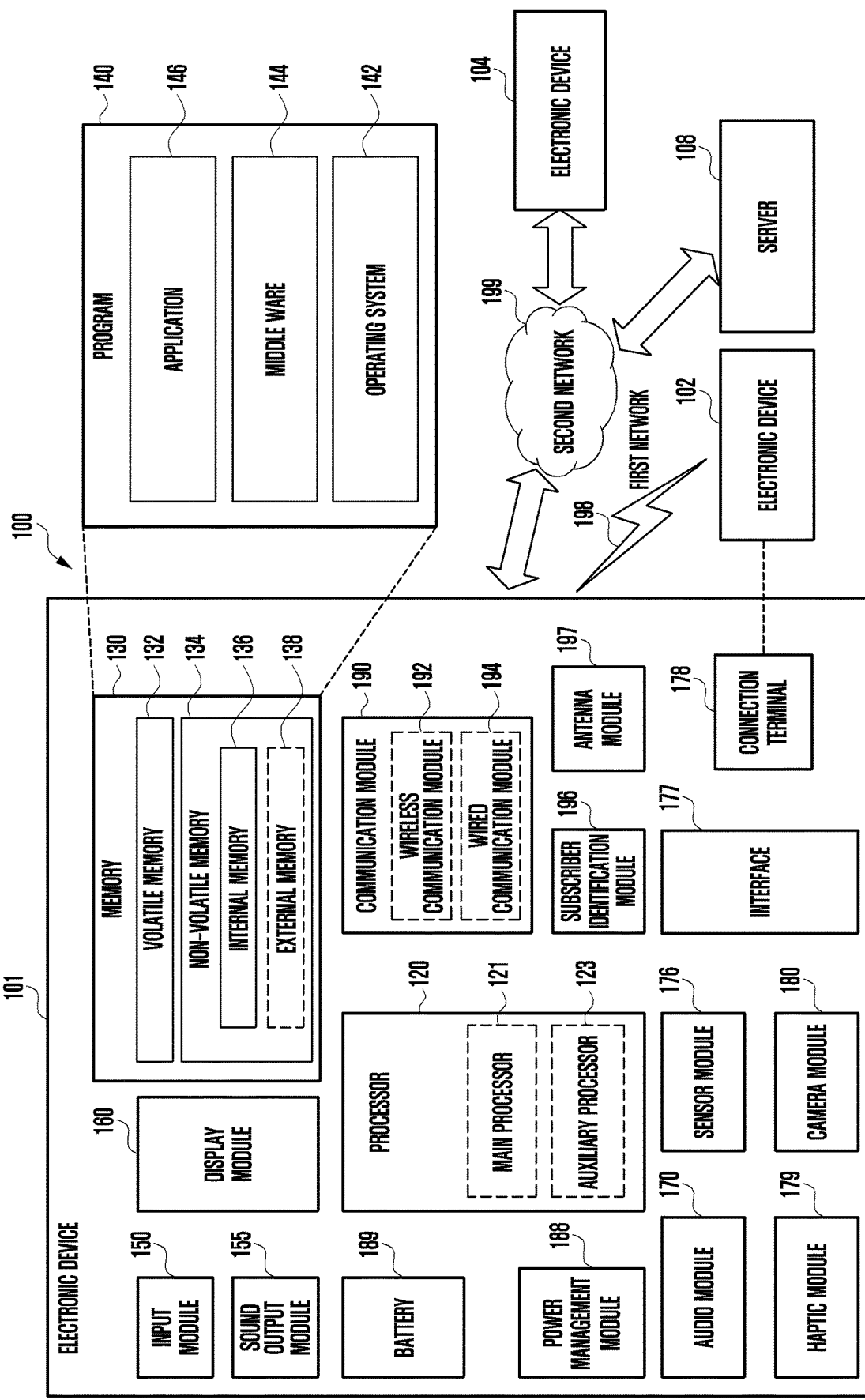
FIG. 1 is a block diagram of an electronic device in a network environment, according to various embodiments.

It should be appreciated that various embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. The non-volatile memory 134 can include an internal memory 136 and/or an external memory 138. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface. A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator. The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC). The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197. According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

Hereinafter, the same reference numerals should be used for the same or similar components except the case where otherwise indicated.

Figure 2A:
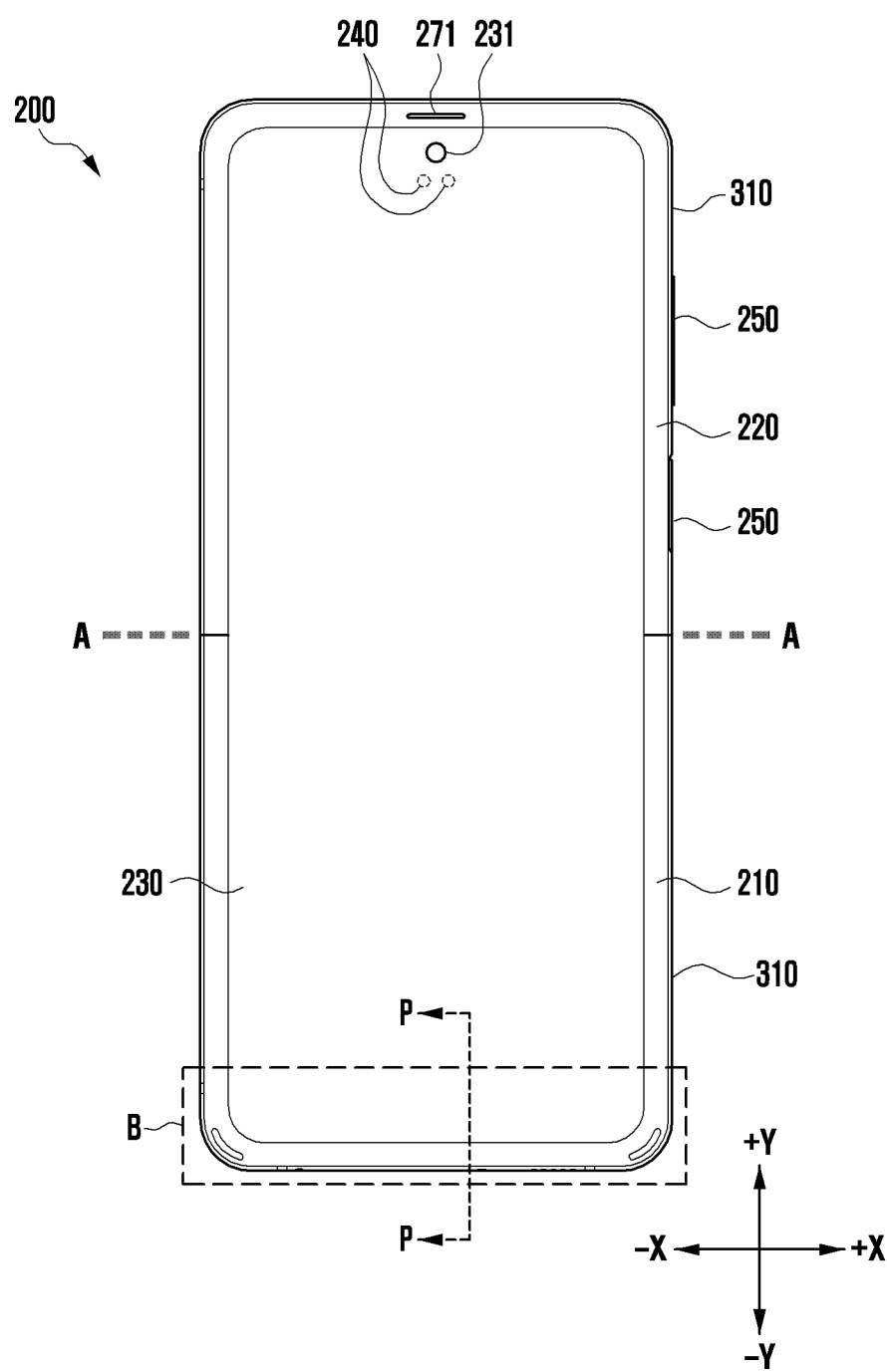
FIG. 2A is a front view of an electronic device according to various embodiments disclosed herein.
Figure 2B:
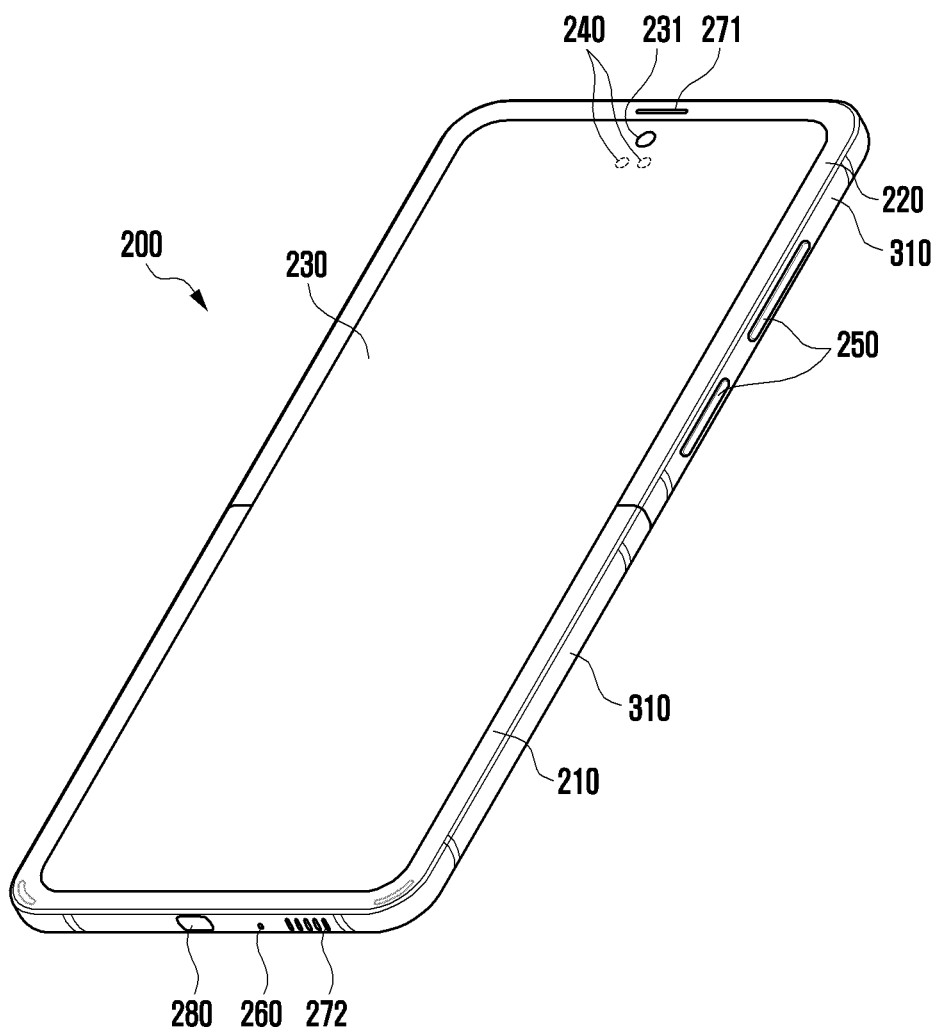
FIG. 2B is a perspective view of an electronic device according to various embodiments disclosed herein.
Figure 2C:
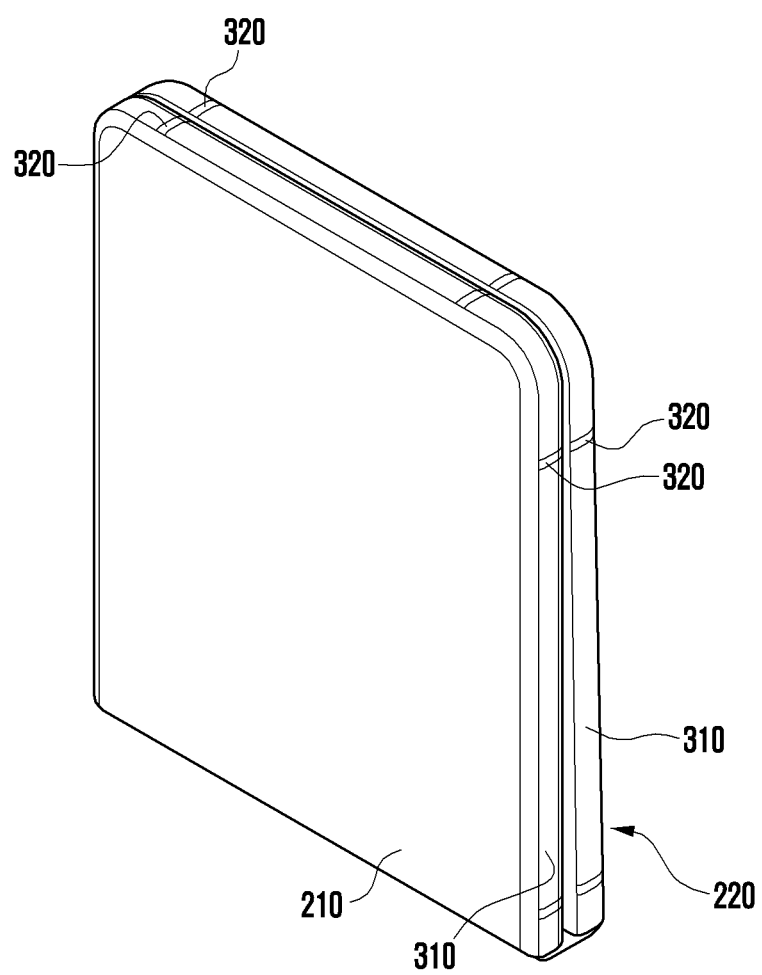
FIG. 2C is a perspective view of an electronic device in a folded state according to various embodiments disclosed herein.

FIG. 2A is a front view of an electronic device according to various embodiments disclosed herein. FIG. 2B is a perspective view of an electronic device according to various embodiments disclosed herein. FIG. 2C is a perspective view of an electronic device in a folded state according to various embodiments disclosed herein.

According to various embodiments, an electronic device 200 shown in FIGS. 2A to 2C may be an embodiment of the electronic device 101 described above with reference to FIG. 1. The electronic device 200 described below may include at least some of the components shown in FIG. 1.

According to various embodiments, the electronic device 200 may include a first housing 210 and a second housing 220. The first housing 210 and the second housing 220 may be foldably connected to each other. For example, the first housing 210 and the second housing 220 may be rotatably coupled to each other through a hinge device (not shown). The hinge device may be a concept of a general term for a hinge structure which rotatably connects the first housing 210 and the second housing 220. For example, the second housing 220 may be rotated with respect to the first housing 210 and folded.

According to various embodiments, as shown in FIG. 2C, the first housing 210 and the second housing 220 are folded, and thus the overall shape of the electronic device 200 may be changed. In an embodiment, an angle or a distance between the first housing and the second housing may vary depending on whether the electronic device is in an unfolded state, a folded state, or an intermediate state. In an embodiment, the first housing 210 and the second housing 220 may be folded with reference to an axis (e.g., an axis A-A of FIG. 2A) parallel with a width direction (e.g., the X-axis direction of FIG. 2A) of the electronic device 200. In another embodiment, the first housing 210 and the second housing 220 can also be folded with reference to an axis parallel with a longitudinal direction (e.g., the Y-axis direction of FIG. 2A) of the electronic device 200.

According to various embodiments, the first housing 210 and the second housing 220 may be disposed on opposite sides about a folding axis A-A, and may have an overall symmetrical shape with reference to the folding axis A-A. According to some embodiments, the first housing 210 and the second housing 220 may have an asymmetrical shape with reference to the folding axis A-A.

According to various embodiments, at least a part of each of the first housing 210 and the second housing 220 may include a side housing 310 configuring an exterior of the electronic device 200. In an embodiment, the side housing 310 may be formed of a conductive material such as a metal material. For example, the side housing 310 may be formed of a metal material including aluminum (Al). As will be described later, the side housing 310 may be connected to an antenna integrated circuit (or antenna IC) (e.g., the antenna module 197 of FIG. 1) of the electronic device 200, and be thus used as an antenna operating in at least one band. In an embodiment, an antenna may include a near field communication (NFC) antenna, a wireless charging antenna, and/or a magnetic secure transmission (MST) antenna. For example, the antenna may perform short-range communication with an external device, or wirelessly transmit/receive power required for charging.

According to various embodiments, the electronic device 200 may include a display module 230 (e.g., the display module 160 of FIG. 1) supported by the first housing 210 and the second housing 220. The display module 230 may include all of various devices capable of displaying visual information. In an embodiment, at least a part of the display module 230 may be folded by folding the first housing 210 and the second housing 220. The folding of the display module 230 may include both a completely folding deformation and a bending deformation while maintaining a predetermined curvature.

According to various embodiments, the display module 230 may be a flexible display of which at least a partial region may be folded. In an embodiment, a substrate of the display module 230 may be formed of a flexible material. For example, the substrate of the display module 230 may be formed of a polymer material such as polyethylene terephthalate (PET) and polyimide (PI), or glass processed to have a very thin thickness.

Referring to FIG. 2C, in a state where the electronic device 200 is folded, the first housing 210 and the second housing 220 may substantially face each other. Thus, since the electronic device 200 may be folded to improve portability of the electronic device 200, it is possible to more compactly manufacture the electronic device 200 including the large-area display module 230. In addition, since a part of the display module 230 exposed to the outside is reduced in the folded state as shown in FIG. 2C, damage or contamination of the display module 230 can be prevented.

According to various embodiments, the display module 230 may include a hole 231 for transmitting external light to a camera module (e.g., the camera module 180 of FIG. 1) which may be disposed on a rear surface of the display module 230. For example, as shown in FIG. 2A, the hole 231 which transmits light to a camera module may be positioned at an upper end portion of the display module 230. In an embodiment, various sensor modules (e.g., an infrared sensor and an illuminance sensor) 240 related to light may be disposed around the hall 231.

According to various embodiments, the electronic device 200 may include a physical button 250 capable of generating an electrical signal by being pressed by an external force. For example, as shown in FIGS. 2A and 2B, at least one physical button 250 may be disposed on a side surface of the electronic device 200.

According to various embodiments, the electronic device 200 may include a microphone hole 260 and speaker holes 271 and 272. The microphone hole 260 may include a microphone disposed therein so as to acquire external sound, and in some embodiments, multiple microphones may be disposed therein so as to detect the direction of sound. The speaker holes 271 and 272 may include an external speaker hole 272 and a phone call receiver hole 271. In some embodiments, the speaker holes 271 and 272 and the microphone hole 260 may be implemented as a single hole, or only a speaker may be included without the speaker holes 271 and 272 (e.g., a piezo speaker).

According to various embodiments, the electronic device 200 may include a connection interface 280 (e.g., the interface 177 of FIG. 1). The connection interface 280 may include, for example, a high definition multimedia interface (HDMI), a universal serial bus (USB) interface, an SD card interface, and/or an audio interface. In an embodiment, the connection interface 280 may electrically or physically connect the electronic device 200 to an external electronic device, and may include a USB connector, an SD card/MMC connector, or an audio connector. For example, as shown in FIG. 2B, a connector 280 which may be connected to an external electronic device (e.g., another electronic device, a charging device, an audio device, etc.) may be disposed at a lower end portion of the electronic device 200.

Figure 3:
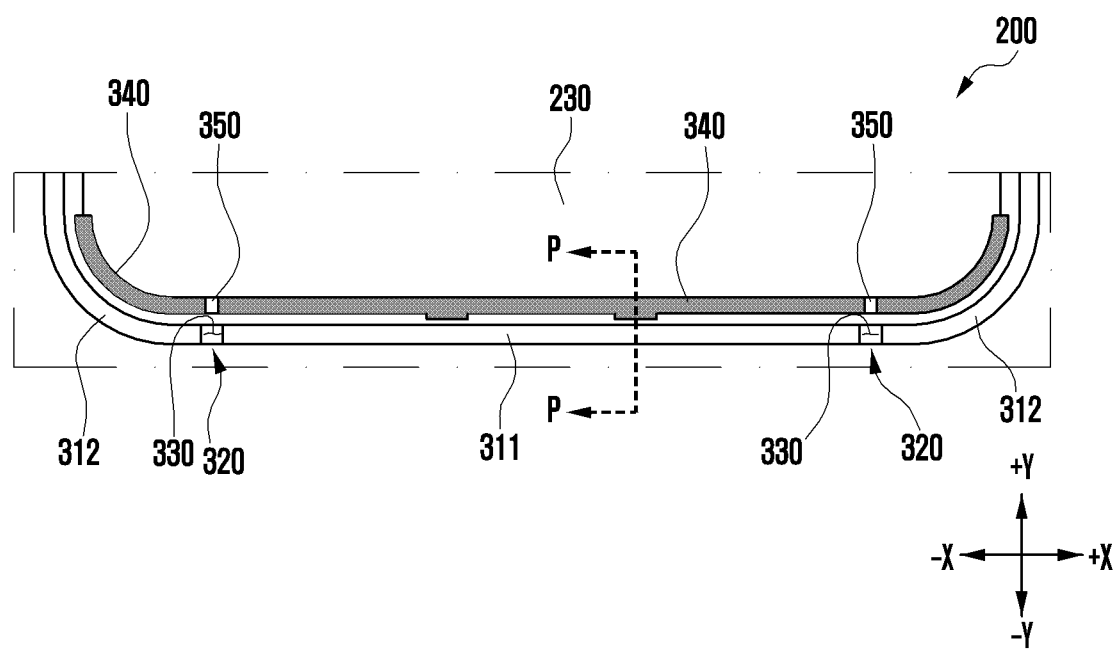
FIG. 3 is a partial view of the inside of region B shown in FIG. 2A.
Figure 4A:
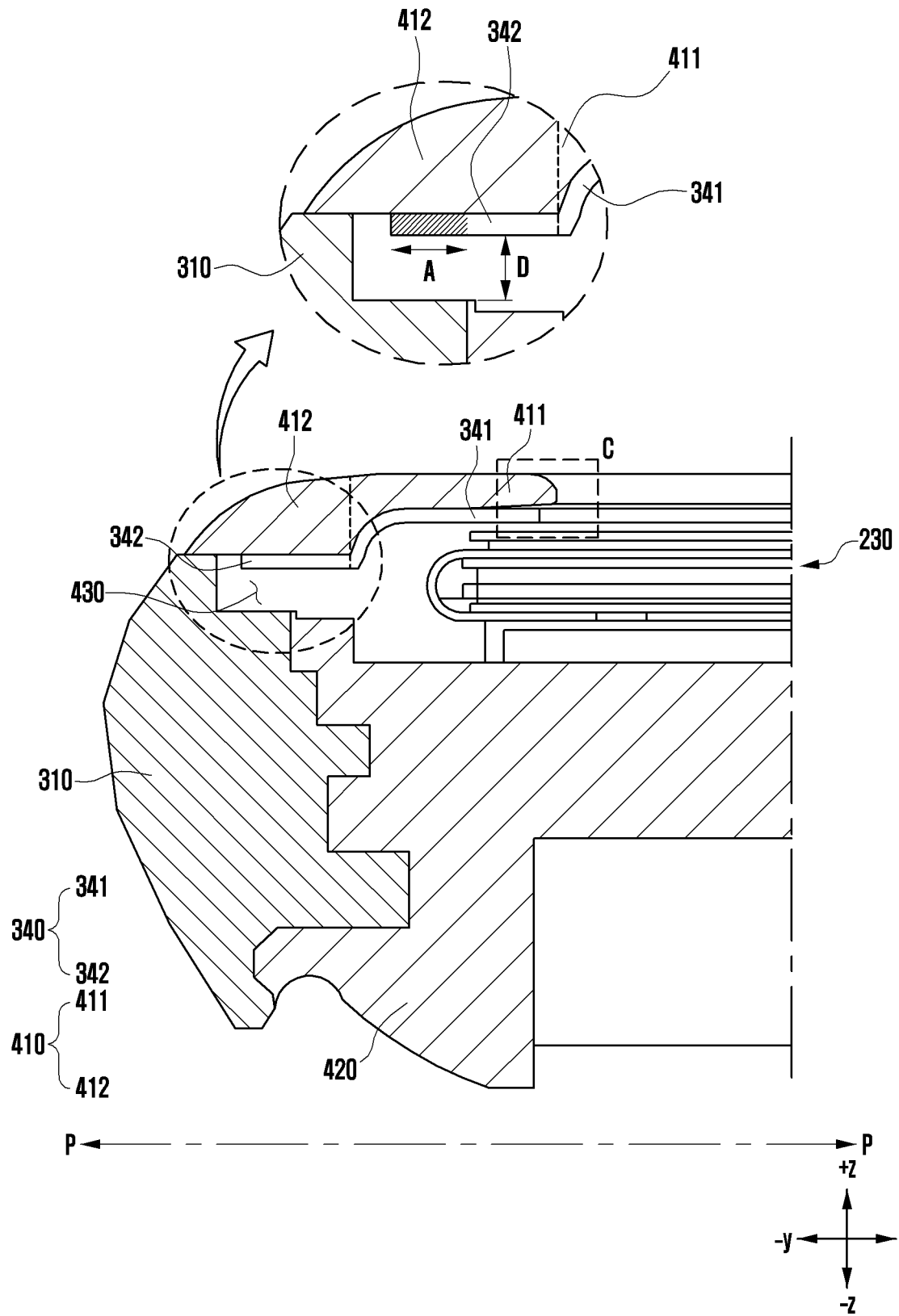
FIG. 4A is a cross-sectional view taken along line P-P shown in FIG. 2A.
Figure 4B:
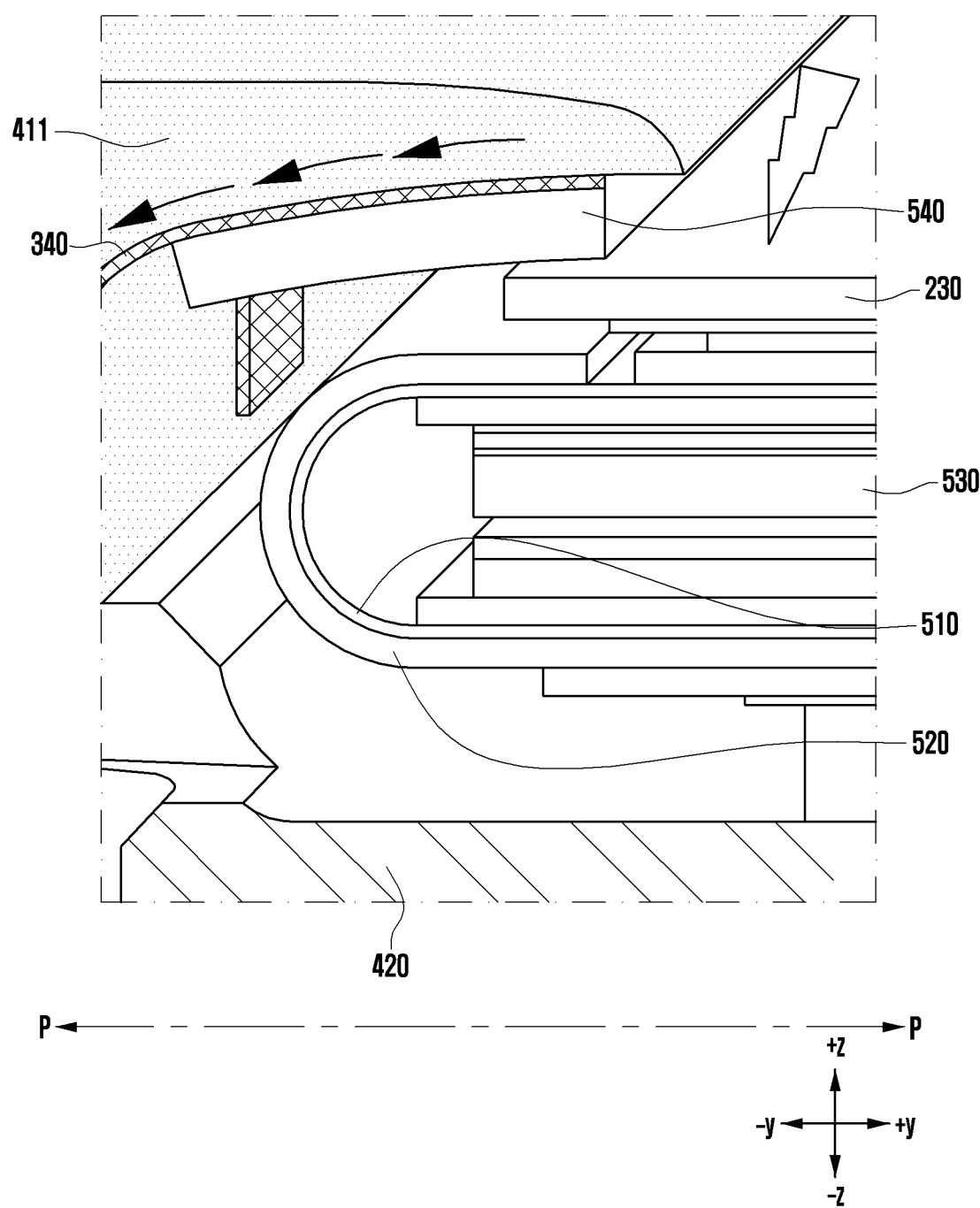
FIG. 4B is an enlarged view of region c of FIG. 4A.

FIG. 3 is a partial view of the inside of region B shown in FIG. 2A. FIG. 4A is a cross-sectional view taken along line P-P shown in FIG. 2A. FIG. 4B is an enlarged view of region c of FIG. 4A.

As shown in FIG. 3, the electronic device 200 according to various embodiments disclosed herein may include the side housing 310 configuring a side exterior of the electronic device 200. In an embodiment, the side housing 310 may be disposed to surround the display module 230 of the electronic device 200. In some embodiment, the side housing 310 may be formed of a conductive material such as a metal material. For example, the side housing 310 may be formed of a metal material including aluminum (Al). The electronic device 200 may include a protection member 410 disposed to cover a part of the side housing 310 and the display module 230. Referring to FIGS. 3 and 4A, the protection member 410 may be disposed along a side edge of the electronic device 200 to cover a part of the display module 230 and a part of the side housing 310. For example, the protection member 410 may be disposed along an edge of the display module 230. In an embodiment, the protection member 410 may include a first portion 411 facing the display module 230, and a second portion 412 facing the side housing 310. In an embodiment, the first portion 411 of the protection member 410 may be in a state of covering at least a part of the outer periphery of the display module 230 when the display module 230 is viewed in the −Z direction with reference to FIG. 4A. In an embodiment, the second portion 412 of the protection member 410 may extend from the first portion 411 of the protection member 410 to face a part of the side housing 310. For example, referring to FIG. 4A, the second portion 412 of the protection member 410 may be spaced apart from the side housing 310 in the +Z direction with reference to FIG. 4A to face a part of the side housing 310. The second portion 412 of the protection member 410 is spaced apart from the side housing 310 in the +Z direction with reference to FIG. 4A, so that a separation space 430 may be located between the side housing 310 and the second portion 412 of the protection member 410. As will be described later, a conductive member 340 may be disposed on the protection member 410. The conductive member 340 may induce a flow of electric charge from the protection member 410 to a ground having a relatively low potential. The conductive member 340 may be disposed to extend from the first portion 411 of the protection member 410 to the second portion 412. As the separation space 430 is located between the side housing 310 and the conductive member 340 disposed in the second portion 412, a capacitance (C) may be generated by the separation space 430, the side housing 310, and the conductive member 340 disposed in the second portion 412 of the protection member 410.

According to various embodiments, the side housing 310 may be formed of a conductive material and used as an antenna of the electronic device 200. The side housing 310 may be electrically connected to a communication module included in the electronic device 200 to transmit or receive a communication signal (e.g., an RF signal) to an external device. In an embodiment, the side housing 310 may be electrically connected to the communication module through the antenna IC. The antenna IC may be a component which transmits a radio frequency (RF) signal. The antenna IC may transmit an RF signal processed by the communication module of the electronic device 200 to the side housing 310 serving as an antenna, or transmit an RF signal received from the side housing 310 to the communication module.

According to various embodiments, as shown in FIG. 3, the side housing 310 may include a plurality of first segment portions 320. The side housing 310 may be physically segmented into a plurality of parts by the first segment portions 320. The first segment portions 320 may be defined by spaces formed in the side housing 310 such that one side housing 310 may be segmented into a plurality of parts. In an embodiment, referring to FIG. 3, the side housing 310 may be physically segmented into a first side housing 311 and a second side housing 312 by the first segment portions 320. In some embodiments, the first side housing 311 may be a part of the side housing 310 disposed between edges of the electronic device 200 to form a portion of the exterior of the electronic device 200. The second side housing 312 may be a part of the side housing 310 disposed at the edges of the electronic device 200 to form a portion the exterior of the electronic device 200.

In an embodiment, the side housing 310 may be electrically segmented as first insulating members 330 disposed in the first segmented portions 320. The first insulating members 330 may refer to a material having low conductivity or a material having a low dielectric constant. In some embodiments, when the side housing 310 is used as an antenna of the electronic device 200, an antenna resonant frequency may be determined according to a physical length of the side housing 310. The side housing 310 may be segmented into a plurality of parts having different lengths by the first insulating members 330 disposed in the first segment portions 320. As such, the segmented side housings 310 may have different resonant frequencies, respectively. If the side housings 310 having different resonant frequencies are used, communication (e.g., short-distance communication and long-distance communication) in various frequency bands may be possible.

According to various embodiments, various electronic components driven by transmitting or receiving an electrical signal may be disposed inside the electronic device 200. Such components will be referred herein as "electrical objects". The electrical objects may be formed of a conductive material or may include at least one conductive material. In an embodiment, the electrical objects may be disposed in parts adjacent to the first insulating members 330 which electrically segment the side housing 310 into a plurality of parts. As the electrical objects are disposed adjacent to the first insulating members 330, a coupling phenomenon may occur between the plurality of segmented side housings 310. As described above, each of the side housings 310 may have a pre-configured resonant frequency. When a coupling phenomenon occurs between the plurality of side housings 310, the resonant frequencies of the side housings 310 may be changed. Accordingly, transmission or reception efficiency of a communication signal through the side housings 310 may be reduced.

Figure 6A:
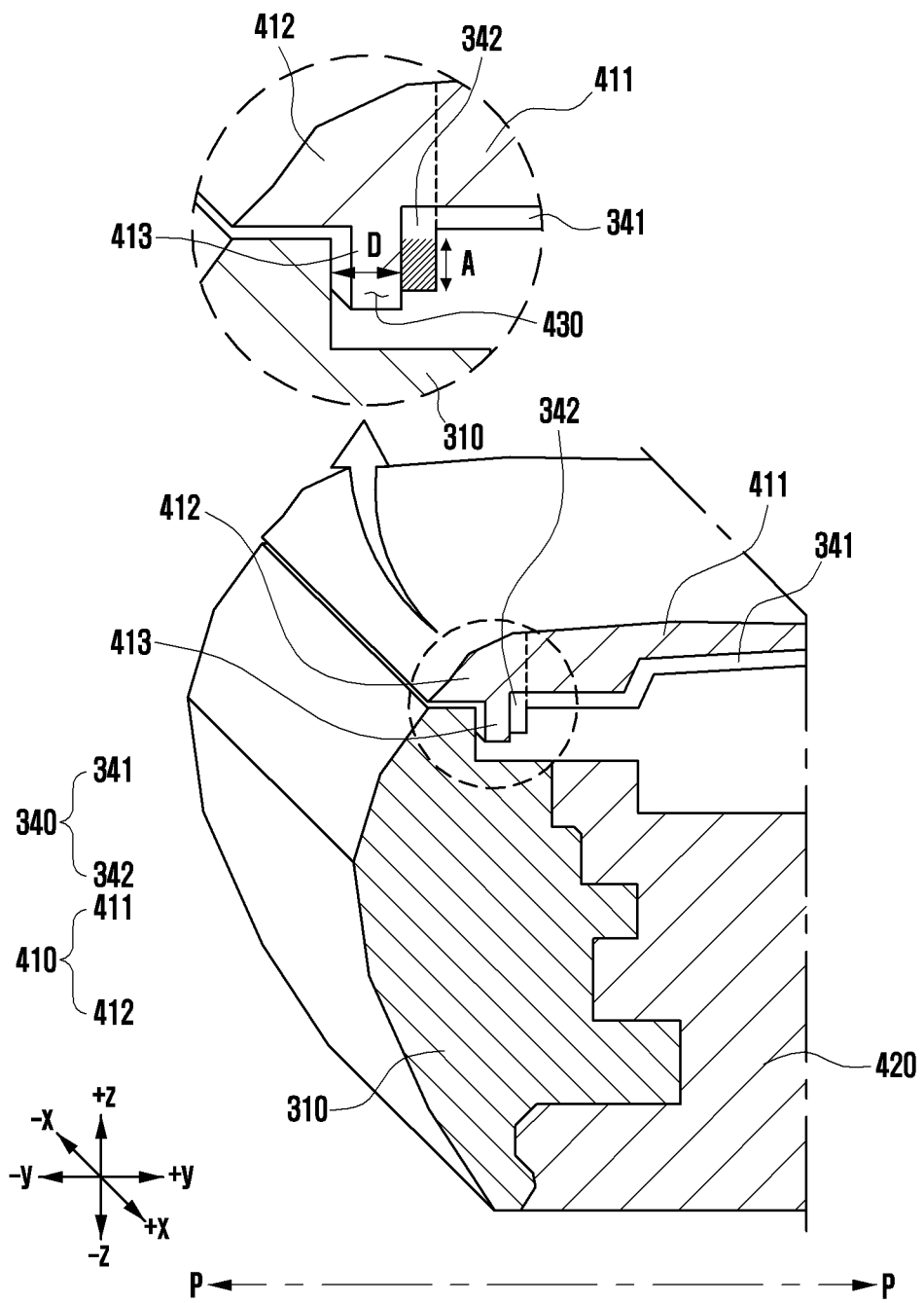
FIG. 6A is a view illustrating a positional relationship between a side housing and a second conductive member, according to various embodiments.

According to various embodiments, the protection member 410 may be formed to have various shapes. In an embodiment, the protection member 410 may include a partition wall portion 413 disposed between the side housing 310 and the outer periphery of the display module 230. Referring to FIG. 6A to be described later, the partition wall portion 413 may be a structure extending from the second portion 412 of the protection member 410 in the −Z direction with reference to FIG. 6A and positioned between the side housing 310 and the outer periphery of the display module 230. In an embodiment, the partition wall portion 413 may be disposed to be spaced apart from the side housing 310 so as not to be in contact with the side housing 310. In another embodiment, the partition wall portion 413 may be disposed between the side housing 310 and the outer periphery of the display module 230 so as to be in contact with the side housing 310.

According to various embodiments, both ends of the display module 230 may move as the first housing 210 and the second housing 220 of the electronic device 200 are folded and unfolded. For example, when the electronic device 200 is folded or unfolded, the both ends of the display module 230 may move with respect to the first housing 210 and the second housing 220, respectively, with reference to the folding axis A-A. Accordingly, the protection member 410 disposed between the side housing 310 and the display module 230 may be disposed to be spaced apart from the both ends of the display module 230 so as not to be in contact with the both ends of the display module 230. In an embodiment, the second portion 412 of the protection member 410 may be spaced apart from the display module 230 in the +Z direction with reference to FIG. 4A. Therefore, a gap may be defined between the display module 230 and the second portion 412 of the protection member 410.

According to various embodiments, as will be described later, the protection member 410 may be formed of a non-metal material such as synthetic resin, ceramic, or engineering plastic, for example, so that a coupling phenomenon does not occur between the plurality of side housings 310 segmented by the first segment portions 320. When the protection member 410 is formed of a non-conductive material, electric charge may be accumulated in the protection member 410. In particular, the protection member 410 may be, as a part frequently contacted when a user grips the electronic device 200, a part where electric charge is well accumulated. Accordingly, a part of the electric charge accumulated in the protection member 410 may move to the inside of the electronic device 200 through the above-described gap between the protection member 410 and the display module 230. The remainder of the electric charge accumulated in the protection member 410 may be conducted to the side housing 310 formed of a conductive material, and delivered to a ground having a relatively low potential (e.g. a "ground potential"). The above-described accumulated electric charge may refer to electric charge generated according to an operation of an electronic component disposed inside the electronic device 200, and may refer to electric charge accumulated outside (or on the surface) of the electronic device 200 and conducted to the inside of the electronic device 200 through a gap disposed in the electronic device 200. Hereinafter, the accumulated electric charge may be meant to encompass all of the above-described electric charge.

In a case where a path through which the electric charge accumulated in the protection member 410 may flow is not provided, an electro static discharge (ESD) phenomenon may occur. An electro static discharge (ESD) phenomenon may refer to an electrical phenomenon caused by instantaneous movement of electric charge accumulated by various factors to another part. An ESD phenomenon may occur in an electronic component due to electric charge accumulated inside or outside the electronic device 200. Since ESD is accompanied by a strong voltage, when an ESD phenomenon occurs in an electronic component, the electronic component may be damaged. Due to such damage, a problem in which the electronic device 200 does not operate properly or performance is deteriorated may occur. For example, when a user grips the electronic device 200, electric charge may be well accumulated in the protection member 410 which is frequently contacted. Electric charge accumulated in the protection member 410 moves to the inside of the electronic device 200 through the above-described gap between the protection member 410 and the display module 230, so that an ESD phenomenon may occur in an electronic component disposed inside the electronic device 200. In various embodiments disclosed herein, the conductive member 340 formed of a conductive material may be disposed on the protection member 410 to induce a flow of electric charge to a ground having a relatively low potential.

According to various embodiments, the electronic device 200 may include a printed circuit board (not shown) electrically connected to at least one ground. The side housing 310 may be electrically connected to the printed circuit board to be electrically connected to the ground. For example, the side housing 310 may be electrically connected to the printed circuit board through a flexible printed circuit board (FPCB) formed of a flexible material. In an embodiment, the electronic device 200 may include the conductive member 340 formed of a conductive material to induce accumulated electric charge to a ground having a relatively low potential. The conductive member 340 may be disposed on the protection member 410. For example, the conductive member 340 may be disposed to extend from the first portion 411 of the protection member 410 to the second portion 412. The conductive member 340 may include a first conductive member 341 disposed in the first portion 411 of the protection member 410, and a second conductive member 342 disposed in the second portion 412 of the protection member 410. The second conductive member 342 may be connected to the first conductive member 341. Referring to FIG. 4A, the second conductive member 342 may be the conductive member 340 extending from the first portion 411 to the second portion 412. In an embodiment, referring to FIG. 3, the first conductive member 341 may be the conductive member 340 extending along the side housing 310. The second conductive member 342 may be the conductive member 340 extending from a partial region of the first conductive member 341 to the second portion 412 of the protection member 410. A flow of electric charge may be induced from the protection member 410 to the side housing 310 connected to the ground through the first conductive member 341 and the second conductive member 342. For example, after electric charge moves from the first conductive member 341 to an end of the second conductive member 342, the electric charge may be discharged into the air and move to the side housing 310. The electric charge having moved to the side housing 310 may move to the ground electrically connected to the side housing 310. Accordingly, as the accumulated electric charge moves to the ground through the conductive member 340, an ESD phenomenon to an electronic component may be alleviated or resolved.

In the above description, for convenience of description, although the first conductive member 341 and the second conductive member 342 of the conductive member 340 are described as separate configurations, actually, the first conductive member 341 and the second conductive member 342 may be a configuration physically and electrically connected to each other.

According to various embodiments, when the conductive member 340 is disposed adjacent to the first insulating members 330, a coupling phenomenon may occur between the plurality of side housings 310 segmented with reference to the first segment portions 320. The conductive member 340 may be segmented into a plurality of parts by second segment portions 350 so as to prevent such a phenomenon. Referring to FIG. 3, the conductive member 340 may be segmented into a plurality of conductive members 340 with reference to the second segment portions 350. For example, the first conductive member 341 and the second conductive member 342 configuring the conductive member 340 may be segmented into a plurality of parts with reference to the second segment portions 350. In an embodiment, the second segment portions 350 may be positioned to correspond to the first segment portions 320. For example, when the electronic device 200 is viewed in the +Y direction with reference to FIG. 3, the first segment portions 320 and the second segment portions 350 may coincide with each other, or one of the first segment portion 320 and the second segment portion 350 may include the other. The conductive members 340 segmented by the second segmentation portions 350 may be disposed on the protection member 410 to correspond to the first side housing 311 and the second side housing 312, respectively. The first conductive member 341 and the second conductive member 342 may be disposed on the protection member 410 so as to correspond to the segmented side housings 310. In an embodiment, a part of the conductive members 340 segmented by the second segmented portions 350 may be disposed on the protection member 410 so as to correspond to the first side housing 311 positioned between edges of the electronic device 200. The remainder of the conductive members 340 segmented by the second segment portions 350 may be disposed on the protection member 410 so as to correspond to the second side housing 312 positioned at the edges of the electronic device 200. The conductive member 340 is segmented and disposed with reference to the second segment portions 350 corresponding to the first segment portions 320, so that a coupling phenomenon occurring between the plurality of side housings 310 by the conductive member 340 may be alleviated or resolved.

According to various embodiments, referring to FIG. 4B, an electronic component configuring the display module 230 may be exposed in a partial region of the display module 230. In a case where electric charge accumulated in the electronic device 200 is conducted to the electronic component configuring the display module 230, damage to the electronic component may occur. A second insulating member 540 may be disposed between the protection member 410 and the display module 230 so as to alleviate such a problem. The second insulating member 540 may be disposed to cover a region where the electronic component of the display module 230 is exposed. In an embodiment, the second insulating member 540 may guide the accumulated electric charge to be conducted to the conductive member 340 without being conducted to the region where the electronic component configuring the display module 230 is exposed. For example, referring to FIG. 4B, the second insulating member 540 may be disposed to cover the first conductive member 341 disposed in the first portion 411 of the protection member 410. In addition, the second insulating member 540 may close a gap between the display module 230 and the first portion 411 of the protection member 410. In a case where electric charge accumulated in the protection member 410 from the outside of the electronic device 200 moves to the inside of the electronic device 200 through the gap between the protection member 410 and the display module 230, the electric charge may move to the conductive member 340 without moving to the region where the electronic component configuring the display module 230 is exposed.

As the second insulating member 540 is disposed to close the gap between the display module 230 and the first portion 411 of the protection member 410, introduction of dust through the gap between the protection member 410 and the display module 230 may be prevented.

According to various embodiments, as shown in FIG. 4B, the display module 230 may include a connection member including a bending portion 510 connected to a display panel and extending to the rear surface of the display module 230, and a protect layer 520 surrounding the outer surface of the bending portion 510. The connection member may be electrically connected to a printed circuit board disposed on a rear surface (e.g., a surface facing the −Z direction with reference to FIG. 4B) of the display module 230. The protect layer 520 configuring the connection member may be formed of a flexible material so as to be bendable together with the bending portion 510 in response to the flow of the bending portion 510. The protect layer 520 may be formed of an insulating material to protect the bending portion 510 from electric charge accumulated in the electronic device 200. The bending portion 510 and may include a display driver IC (DDI). The bending portion 510 may be integrally configured with a substrate (not shown) disposed on the display module 230. For example, the display module 230 may include a chip on panel (COP) structure in which the DDI is disposed on the bending portion 510 integrally configured with the substrate of the display module 230. In some embodiments, the display module 230 may include a chip on film (COF) structure in which the bending portion 510 on which the DDI is disposed is separately manufactured and connected to the substrate of the display module 230. In this case, the bending portion 510 may be a flexible printed circuit board (FPCB). In an embodiment, referring to FIG. 4B, the display module 230 may include a support member 530 formed of a conductive material. The support member 530 may be a ground having a relatively lower potential than its surroundings. For example, the support member 530 may be electrically connected to a printed circuit board connected to at least one ground. Electric charge accumulated in the electronic device 200 may be induced to the support member 530 serving as the ground having a relatively low potential. As electric charge moves to the support member 530, the electric charge may not be accumulated around the support member 530.

According to various embodiments disclosed in herein, electric charge accumulated in the electronic device 200 may move to a place having a relatively low potential in various manners. In an embodiment, the conductive member 340 disposed on the protection member 410 to correspond to the second side housing 312 may be relatively adjacent to the support member 530 of the display module 230 than the conductive member 340 disposed on the protection member 410 to correspond to the first side housing 311. Accordingly, a part of the electric charge accumulated in the electronic device 200 may move from the protection member 410 to the support member 530 having a relatively low potential through the conductive member 340. In addition, another part of the electric charge accumulated in the electronic device 200 may move to the ground connected to the side housing 310 via the protection member 410 and the side housing 310 through the conductive member 340.

According to various embodiments, the conductive member 340 may be disposed on the protection member 410 in various manners. In an embodiment, the conductive member 340 may be manufactured in the form of a thin film tape to be attached to the protection member 410 via an adhesive member such as a bond or a double-sided tape. In some embodiments, the conductive member 340 may be deposited at the protection member 410 in the form of a thin film. For example, the conductive member 340 may be deposited by using various methods such as a chemical vapor deposition (CVD) method or a physical vapor deposition (PVD) method. In another embodiment, the conductive member 340 may be disposed on the protection member 410 by using a laser direct structuring (LDS) method. For example, in a case where the conductive member 340 is formed by using the LDS method, a pattern of the conductive member 340 may be processed, using a laser, on the protection member 410 formed of a non-metal material such as plastic, and the conductive member 340 may be configured in such a manner that a metal material such as copper or nickel is plated on the pattern. In addition, the conductive member 340 may be disposed on the protection member 410 in various manners within a range which can be deformed by a person skilled in the art.

According to various embodiments, at least a portion of the first and/or second housings 210 and 220 may be formed of a material other than a metal. For example, portions of the first and/or second housings 210 and 220 adjacent to the first insulating members 330 disposed in the first segment portions 320 of the side housing 310 may be formed of a material other than a metal. Referring to FIG. 4A, an internal injection material 420 forming a portion of the first and/or second housings 210 and 220 may be adjacent to the first insulating members 330. The internal injection molding 420 may be formed of a non-metal material such as synthetic resin, ceramic, or engineering plastic. Accordingly, a coupling phenomenon between the plurality of side housings 310 segmented by the first insulating members 330 may be alleviated or resolved.

Figure 5:
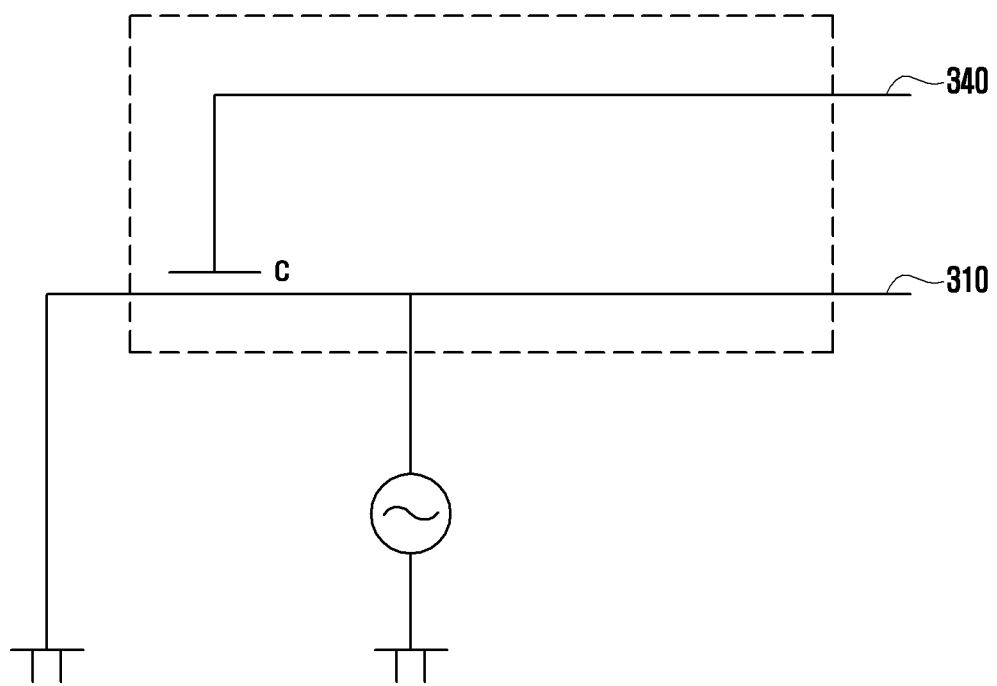
FIG. 5 is a schematic view of a circuit configured by a side housing and a conductive member.
Figure 6B:
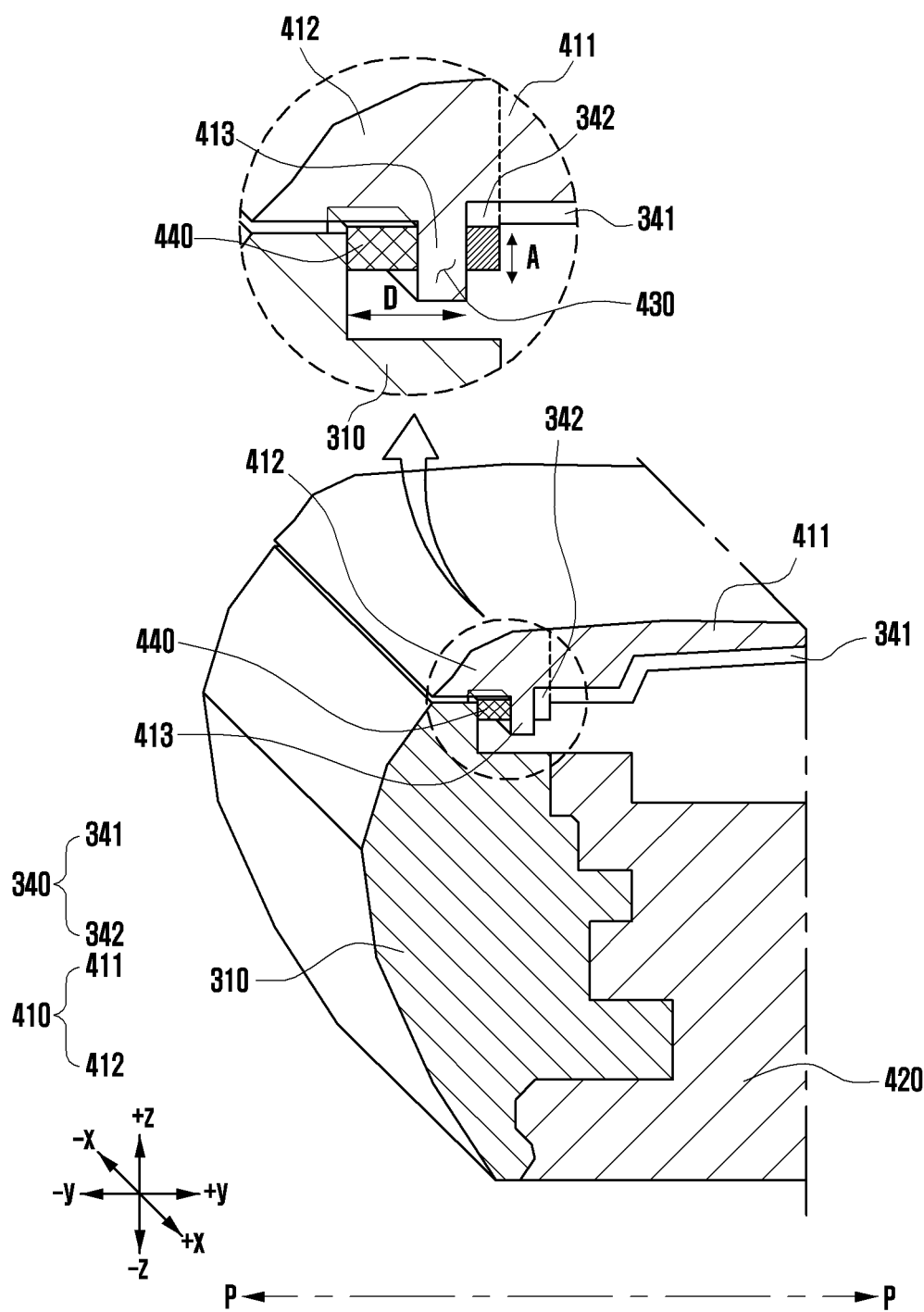
FIG. 6B is a view illustrating a positional relationship between a side housing and a second conductive member, according to another embodiment.
Figure 6C:
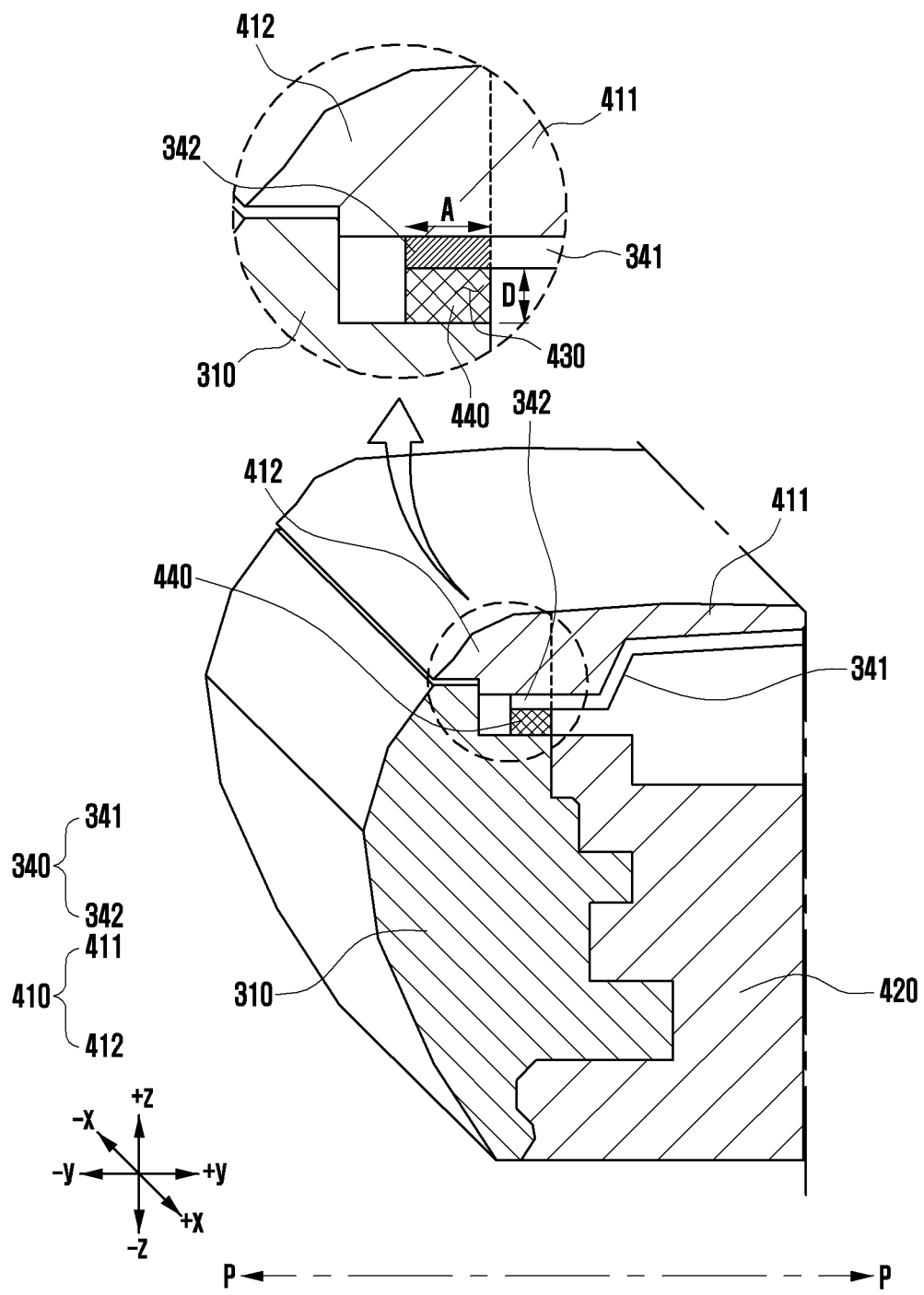
FIG. 6C is a view illustrating a positional relationship between a side housing and a second conductive member, according to still another embodiment.

FIG. 5 is a schematic view of a circuit configured by the side housing 310 and the conductive member 340. FIG. 6A is a view illustrating a positional relationship between the side housing 310 and the second conductive member 342, according to various embodiments. FIG. 6B is a view illustrating a positional relationship between the side housing 310 and the second conductive member 342, according to another embodiment. FIG. 6C is a view illustrating a positional relationship between the side housing 310 and the second conductive member 342, according to still another embodiment.

According to various embodiments, the side housing 310 may be connected to the antenna IC to function as an antenna which transmits and/or receives a communication signal to and/or from an external device. The antenna IC may include a plurality of circuit portions. For example, the antenna IC may include various antenna-related circuits such as a matching circuit configured to perform impedance matching, and a switching circuit configured to allow an antenna to correspond to a wideband characteristic. In an embodiment, the matching circuit may be a circuit including an element such as an inductor or a capacitor to match impedance. In an embodiment, the switching circuit may increase physical lengths of antenna radiators (e.g., the side housing 310) by short-circuiting the antenna radiators which are electrically open to each other. The matching circuit and the switching circuit of the circuit portions described above are not interpreted as being limited by their names, but should be understood as a circuit including an element capable of performing a corresponding function. For example, the switching circuit may be referred to as a switching circuit portion, and the matching circuit may be referred to as a variable element portion. In an embodiment, a part of the matching circuit or the switching circuit among the antenna-related circuits may be omitted.

In various embodiments disclosed herein, the side housing 310 of the electronic device 200 may be connected to the antenna IC to function as an antenna. In a relationship in which the side housing 310 of the electronic device 200 and the conductive member 340 are arranged to be spaced a predetermined distance (D) apart from each other, a capacitance (C) may be configured between the side housing 310 and the conductive member 340. Referring to FIG. 5, the side housing 310 and the conductive member 340 may configure one circuit including a capacitor and function as an antenna. For example, at least a part of the conductive member 340 may face the side housing 310 in a state of being spaced the predetermined distance (D) apart from the same. In an embodiment, referring to FIG. 4A, the conductive member 340 may include the second conductive member 342 extending from a part of the first conductive member 341 to the second portion 412 of the protection member 410. The second conductive member 342 may be disposed in the second portion 412 of the protection member 410. As described above, the second portion 412 of the protection member 410 may be positioned to be spaced apart from the side housing 310 in the +Z direction with reference to FIG. 4A in a state of facing the side housing 310. As the second conductive member 342 is disposed in the second portion 412 of the protection member 410, the second conductive member 342 may be positioned to be spaced apart from the side housing 310 in the +Z direction with reference to FIG. 4A. Accordingly, the separation space 430 may be disposed between the second conductive member 342 and the side housing 310. The predetermined distance (D) exists between the second conductive member 342 and the side housing 310 and an overlapping region (A) in which the second conductive member 342 and the side housing 310 face each other exists, so that a capacitance (C) may be generated in the electronic device 200 by the second conductive member 342, the side housing 310, and the separation space 430. The capacitance (C) may be used to adjust impedance of an antenna. By adjusting the impedance of the antenna through the capacitance (C), the antenna performance of the electronic device 200 may be improved.

In various embodiments disclosed herein, the impedance of the antenna may be adjusted such that the antenna performance of the electronic device 200 may be improved. In an embodiment, the antenna impedance may be adjusted through the matching circuit of the antenna IC. In addition, the impedance of the antenna may be finely adjusted through the capacitance (C) formed by the second conductive member 342 and the side housing 310. The antenna performance of the electronic device 200 may be improved through appropriate impedance matching.

According to various embodiments, as shown in FIG. 5, the conductive member 340 may function as an antenna. The side housing 310 and the conductive member 340 may configure one circuit including a capacitor and function as an antenna. Accordingly, the conductive member 340 may transmit or receive a communication signal to or from an external device. The conductive member 340 may adjust a physical length to adjust a resonant frequency of the conductive member 340. Frequencies of various bands may be transmitted or received by variously changing the resonant frequency.

According to various embodiments, a capacitance (C) may be defined as $\varepsilon_r \varepsilon_o A/D$, $\varepsilon_r$ may be a dielectric constant of a dielectric material 440 positioned between two objects formed of a conductive material, $\varepsilon_o$ may be a dielectric constant when there is a vacuum state between the two objects formed of the conductive material, A may denote an overlapping region where the two objects formed of the conductive material face each other, and D may denote a predetermined distance between the two objects formed of the conductive material. The capacitance (C) may be adjusted to various values by changing the above-described variables. In an embodiment, the capacitance (C) may be adjusted according to a size of the separation space 430 disposed between the second conductive member 342 and the side housing 310. For example, when a predetermined distance (D) between the second conductive member 342 and the side housing 310 increases, the capacitance (C) may decrease. Conversely, when the predetermined distance (D) between the second conductive member 342 and the side housing 310 decreases, the capacitance (C) may increase. In addition, the capacitance (C) may be adjusted according to an overlapping region (A) in which the second conductive member 342 and the side housing 310 face and overlap each other. For example, when the overlapping region (A) of the second conductive member 342 and the side housing 310 increases, the capacitance (C) may increase. Conversely, when the overlapping region of the second conductive member 342 and the side housing 310 decreases, the capacitance (C) may decrease.

According to various embodiments, as shown in FIG. 6A, the dielectric material 440 may be disposed in the separation space 430. In an embodiment, the capacitance (C) may be adjusted through the dielectric material 440. For example, in a mounting structure of the electronic device 200, it may be difficult to adjust a predetermined distance (D) between the second conductive member 342 and the side housing 310, and an overlapping region (A) in which the second conductive member 342 and the side housing 310 face each other.

In this case, the capacitance (C) formed by the second conductive member 342 and the side housing 310 may be adjusted by disposing the dielectric material 440 in the separation space 430.

According to various embodiments, the dielectric material 440 may refer to a part of the side housing 310. Referring to FIG. 6B, the dielectric material 440 may refer to the partition wall portion 413 of the protection member 410 positioned in the separation space 430 disposed between the second conductive member 342 and the side housing 310.

According to various embodiments, as shown in FIG. 6C, the partition wall portion 413 and the dielectric material 440 may be disposed together in the separation space 430. In this case, the capacitance (C) may increase compared to a case in which only the partition wall portion 413 or the dielectric material 440 is disposed in the separation space 430.

According to various embodiments disclosed herein, the conductive member 340 may be attached to the protection member 410 to induce a flow of electric charge accumulated in the electronic device 200 from the protection member 410 to a ground included in the electronic device 200.

A part of the conductive member 340 may be positioned adjacent to the side housing 310 to face the side housing 310. In an embodiment, the conductive member 340 may include the second conductive member 342 extending from a part of the first conductive member 341 to the second portion 412 of the protection member 410. The second conductive member 342 may be spaced a predetermined distance (D) apart from the side housing 310 and disposed in the second portion 412 of the protection member 410. Therefore, the separation space 430 may be disposed between the second conductive member 342 and the side housing 310. Accordingly, a capacitance (C) using, as variables, the predetermined distance (D) between the second conductive member 342 and the side housing 310, the overlapping region (A) of the second conductive member 342 and the side housing 310, and the dielectric constant of the dielectric material 440 positioned between the second conductive member 342 and the side housing 310 may be generated. The impedance of the antenna may be finely adjusted through the capacitance (C) formed by the second conductive member 342 and the side housing 310. The antenna performance of the electronic device 200 may be improved through appropriate impedance matching.

According to various embodiments, when the electronic device 200 is in a folded state, the side housing 310 of the first housing 210 and the side housing 310 of the second housing 220 may face each other. For example, referring to FIG. 2C, the first housing 210 and the second housing 220 may be folded such that the first segment portion 320 disposed on the side housing 310 of the first housing 210 and the first segment portion 320 disposed on the side housing 310 of the second housing 220 coincide with each other. In this case, a coupling phenomenon may occur between the side housing 310 of the first housing 210 and the side housing 310 of the second housing 220. Accordingly, resonant frequencies of the side housing 310 of the first housing 210 and the side housing 310 of the second housing 220 may be changed. Accordingly, transmission or reception efficiency of a communication signal through the side housings 310 may be reduced. According to various embodiments disclosed herein, the conductive member 340 may be disposed at least one of the side housing 310 of the first housing 210 and the side housing 310 of the second housing 220. Among the conductive members 340, the second conductive member 342 facing the side housing 310 may be disposed such that a predetermined distance (D) spaced apart from the side housing 310 and an overlapping region (A) exist. Therefore, a capacitance (C) may be generated between the second conductive member 342 and the side housing 310. The antenna performance of the electronic device 200 may be improved by matching the impedance of the antenna through the capacitance (C).

Figure 7A:
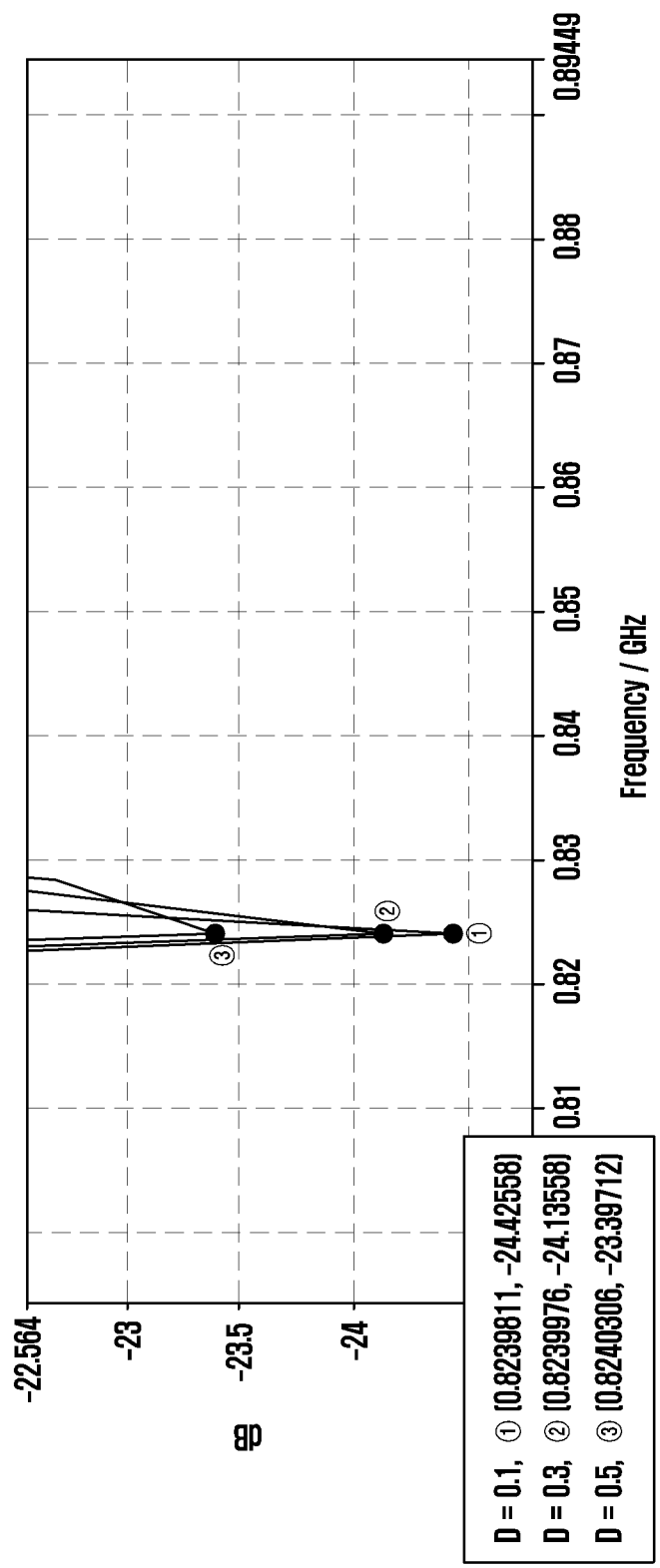
FIGS. 7A to 7C are views illustrating a change in performance of an antenna due to a conductive member, according to various embodiments disclosed herein.
Figure 7B:
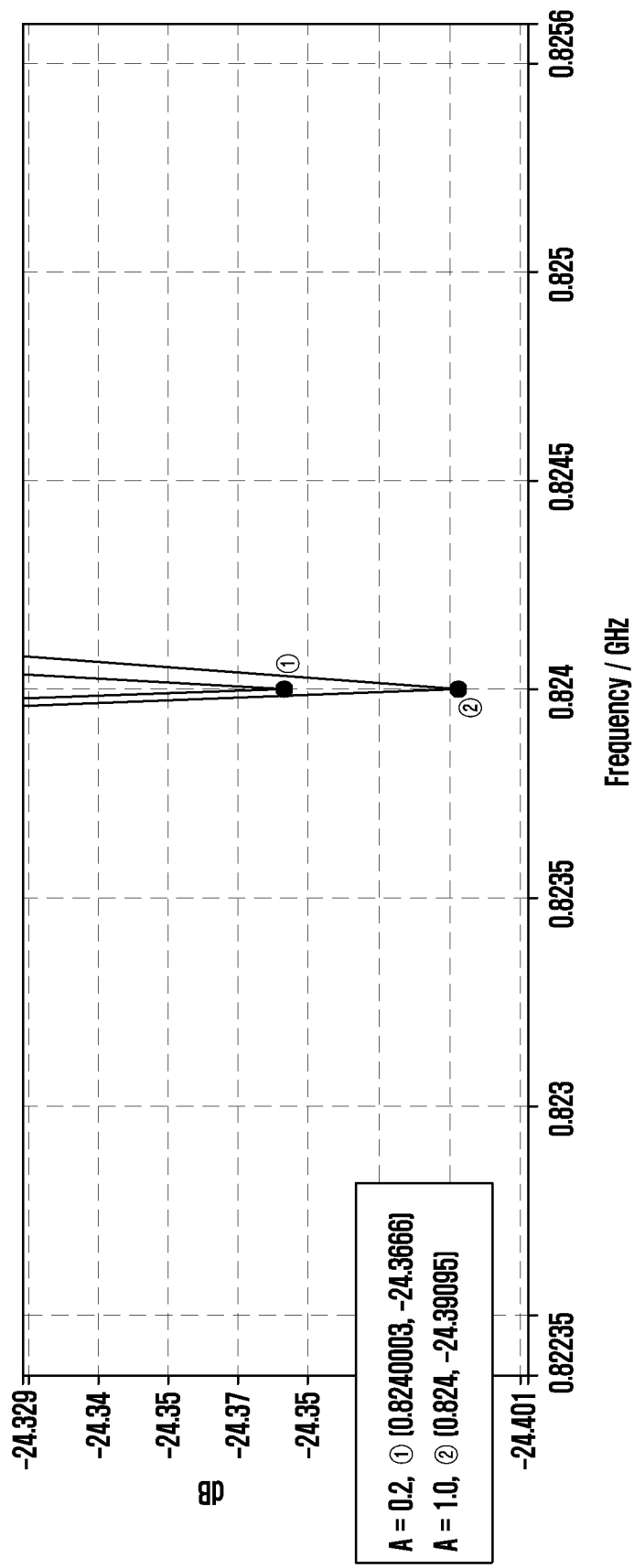
Figure 7C:
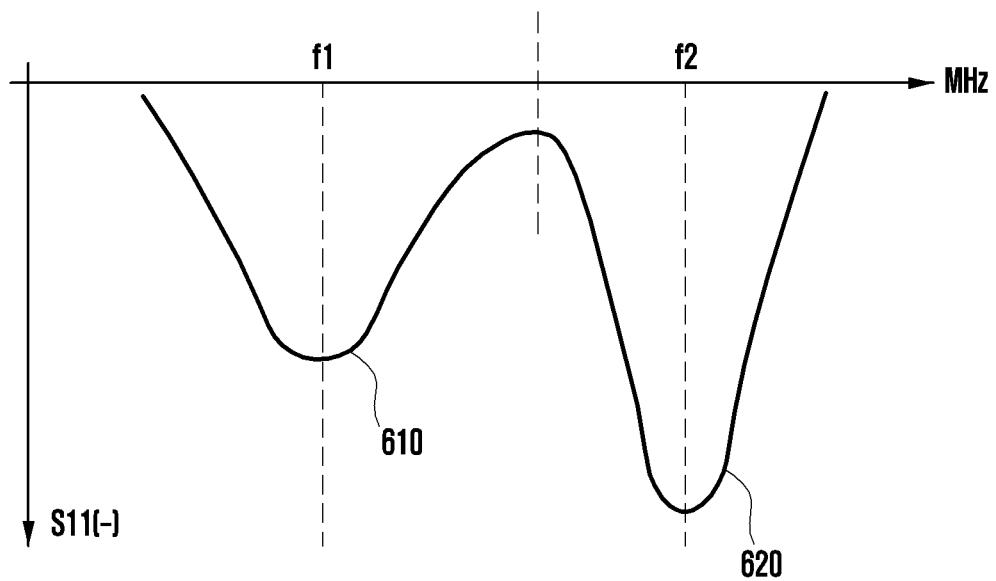

FIGS. 7A to 7C are views illustrating a change in performance of an antenna due to a conductive member, according to various embodiments disclosed herein.

According to various embodiments, in FIGS. 7A to 7C, the X-axis represents a resonant frequency measured in gigahertz (Ghz), and the Y-axis represents an input reflection coefficient S11 measured in decibels (dB). The input reflection coefficient S11 may be, as a coefficient indicating how much a value input to a first port of the antenna IC has been output back to the first port, a coefficient indicating how much the input value has been reflected. The lower a numerical value of the input reflection coefficient S11, the smaller the loss (reflection) that has occurred. Therefore, the lower the numerical value of the input reflection coefficient S11, the better the antenna performance.

According to various embodiments, referring to FIGS. 7A and 7B, it may be viewed that the input reflection coefficient S11 of the antenna is changed according to a change in an overlapping region (A) and a predetermined distance (D) between the second conductive member 342 and the side housing 310. Referring to FIG. 7A along with FIGS. 6A-6C, it may be viewed that as the predetermined distance (D) between the second conductive member 342 and the side housing 310 decreases, the numerical value of the input reflection coefficient S11 decreases. In addition, referring to FIG. 7B along with FIGS. 6A-6C, it may be viewed that as the overlapping region (A) of the second conductive member 342 and the side housing 310 increases, the numerical value of the input reflection coefficient S11 decreases. In various embodiments disclosed herein, the antenna performance of the electronic device 200 may be improved through a capacitance (C). For example, the numerical value of the input reflection coefficient S11 may be lowered by adjusting the predetermined distance (D) between the second conductive member 342 and the side housing 310 and the overlapping region (A) of the second conductive member 342 and the side housing 310. As a result of lowering the numerical value of the input reflection coefficient S11, the antenna performance of the electronic device 200 may be improved.

According to various embodiments, as shown in FIG. 7C, the conductive member 340 may function as an antenna by being electrically connected to the antenna IC through the side housing 310. The conductive member 340 may be in the form of an antenna branched from an antenna of the side housing 310. The conductive member 340 and the side housing 310 may form resonant frequencies of different bands, based on physical lengths, respectively. The electronic device 200 may expand an antenna bandwidth as a frequency band 620 of the conductive member 340 is added to a frequency band 610 of the side housing 310. The electronic device 200 may transmit or receive frequencies of various bands by variously changing resonant frequencies according to physical lengths of the side housing 310 and the conductive member 340.

Figure 8A:
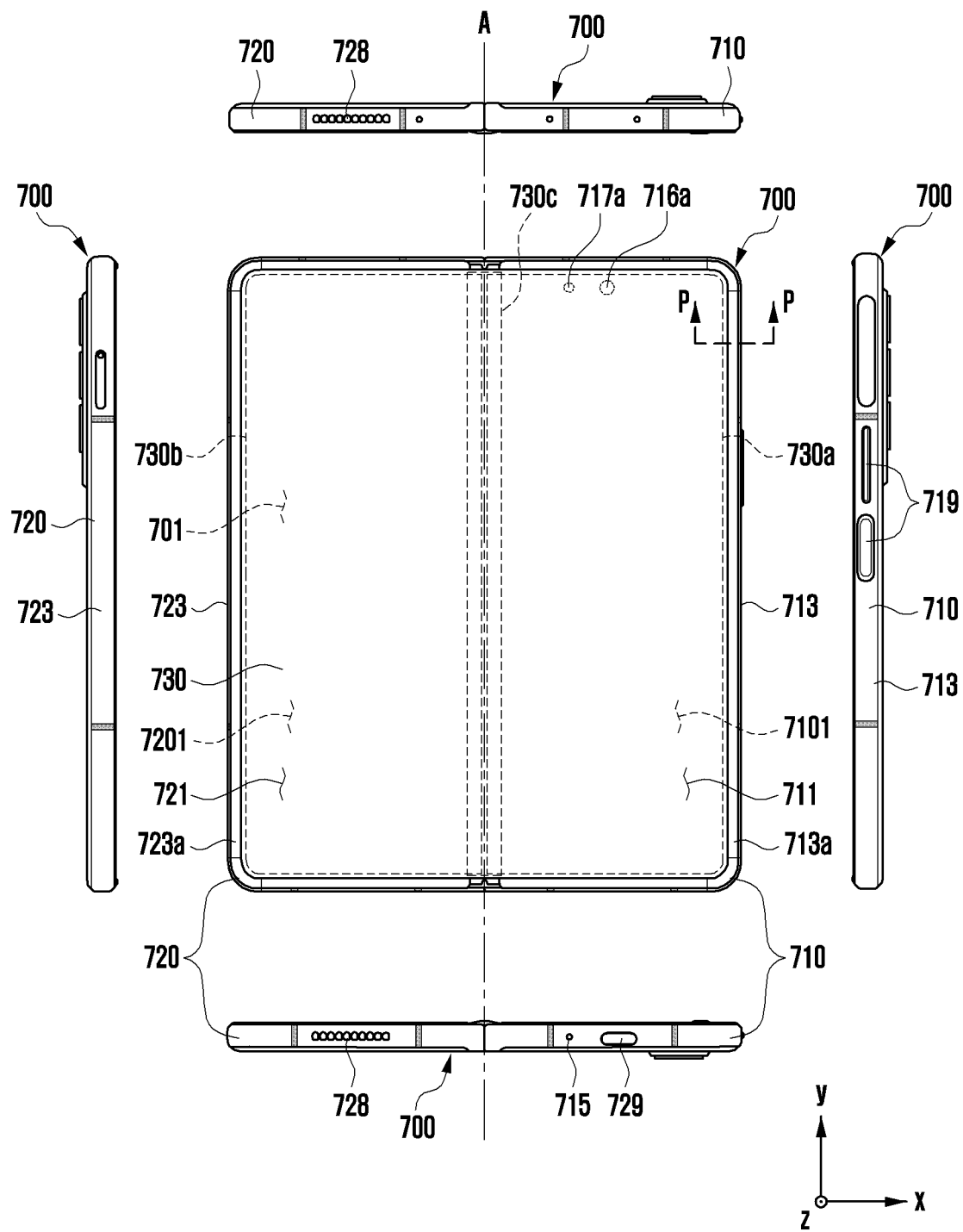
FIGS. 8A and 8B are views viewed from the front and rear of an electronic device in an unfolded stage according to another embodiment.
Figure 8B:
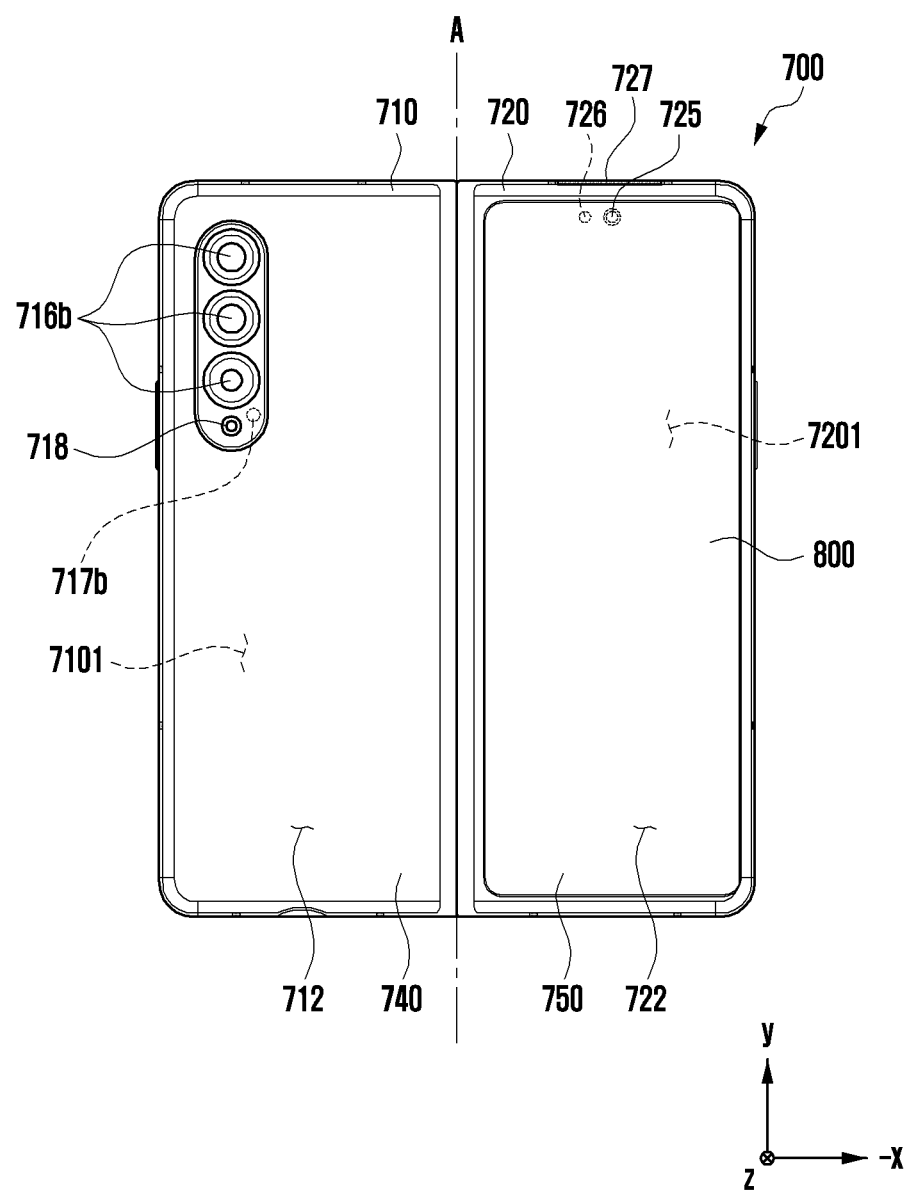
Figure 8C:
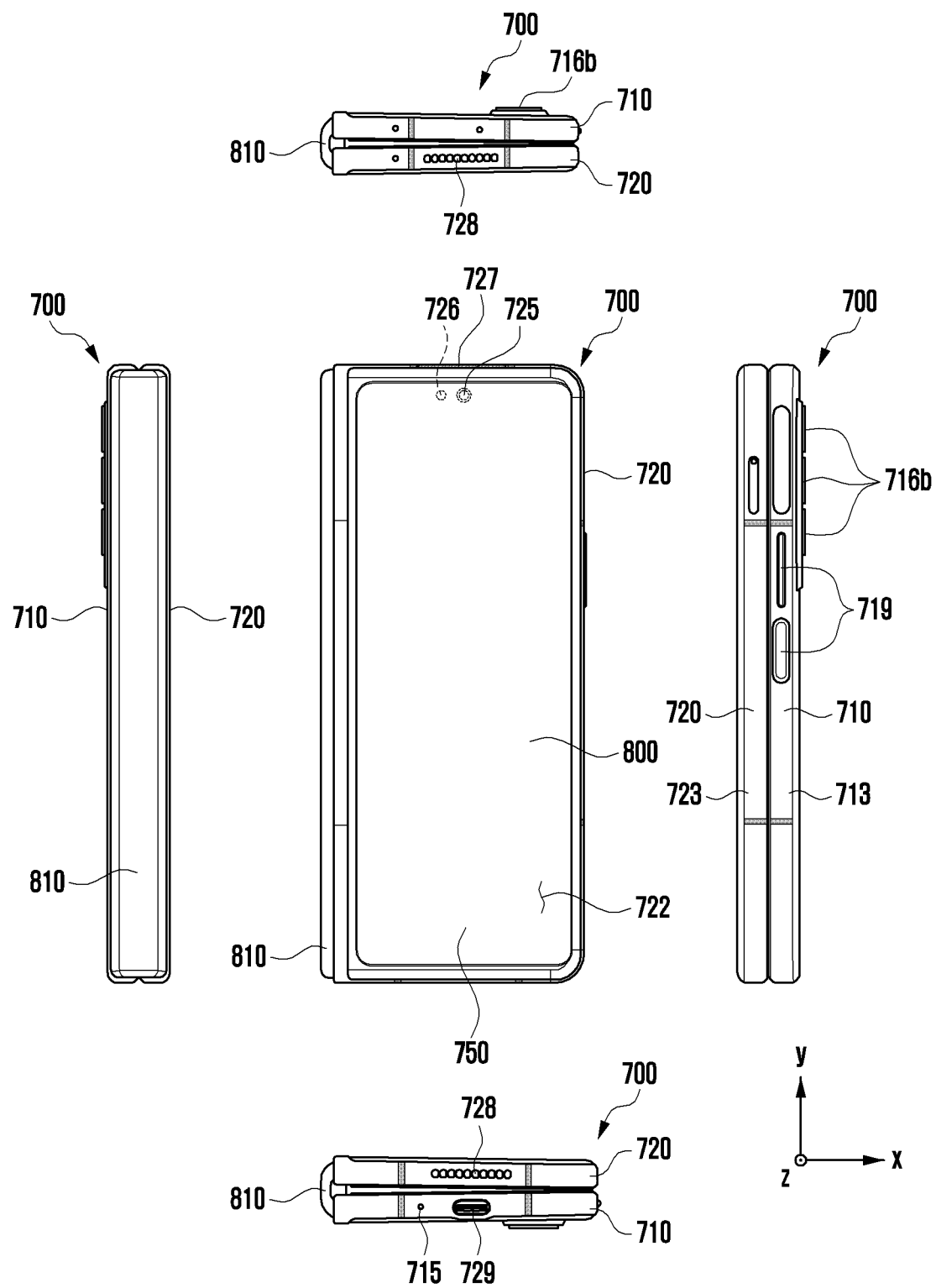
FIGS. 8C and 8D are views viewed from the front and rear of an electronic device in a folded state according to another embodiment.
Figure 8D:
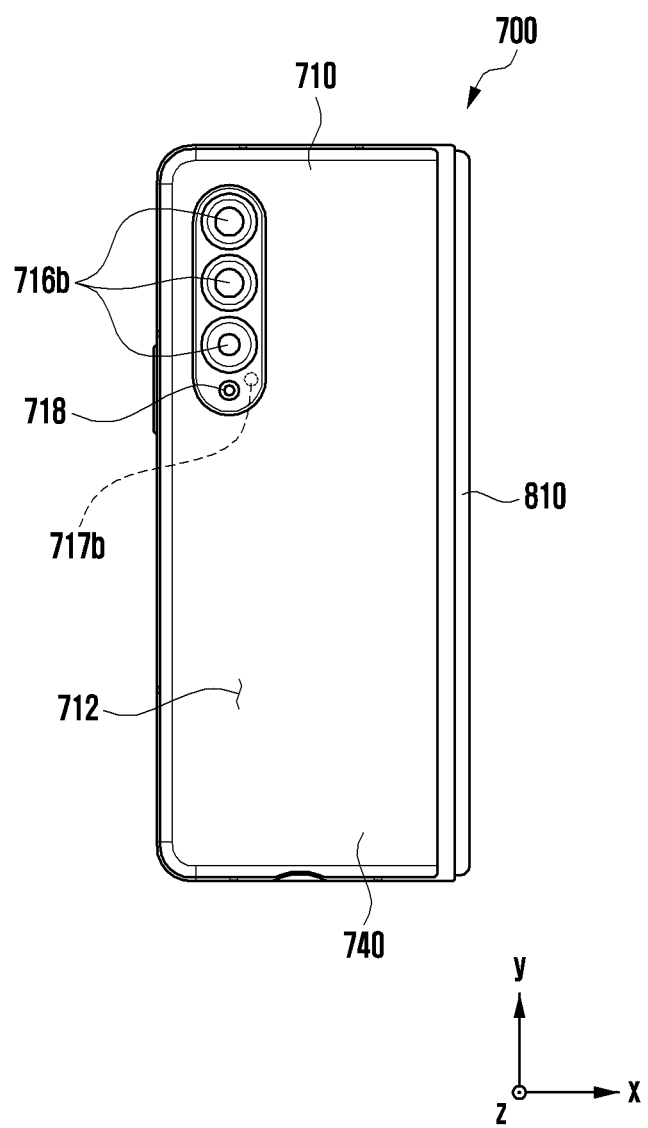
Figure 8E:
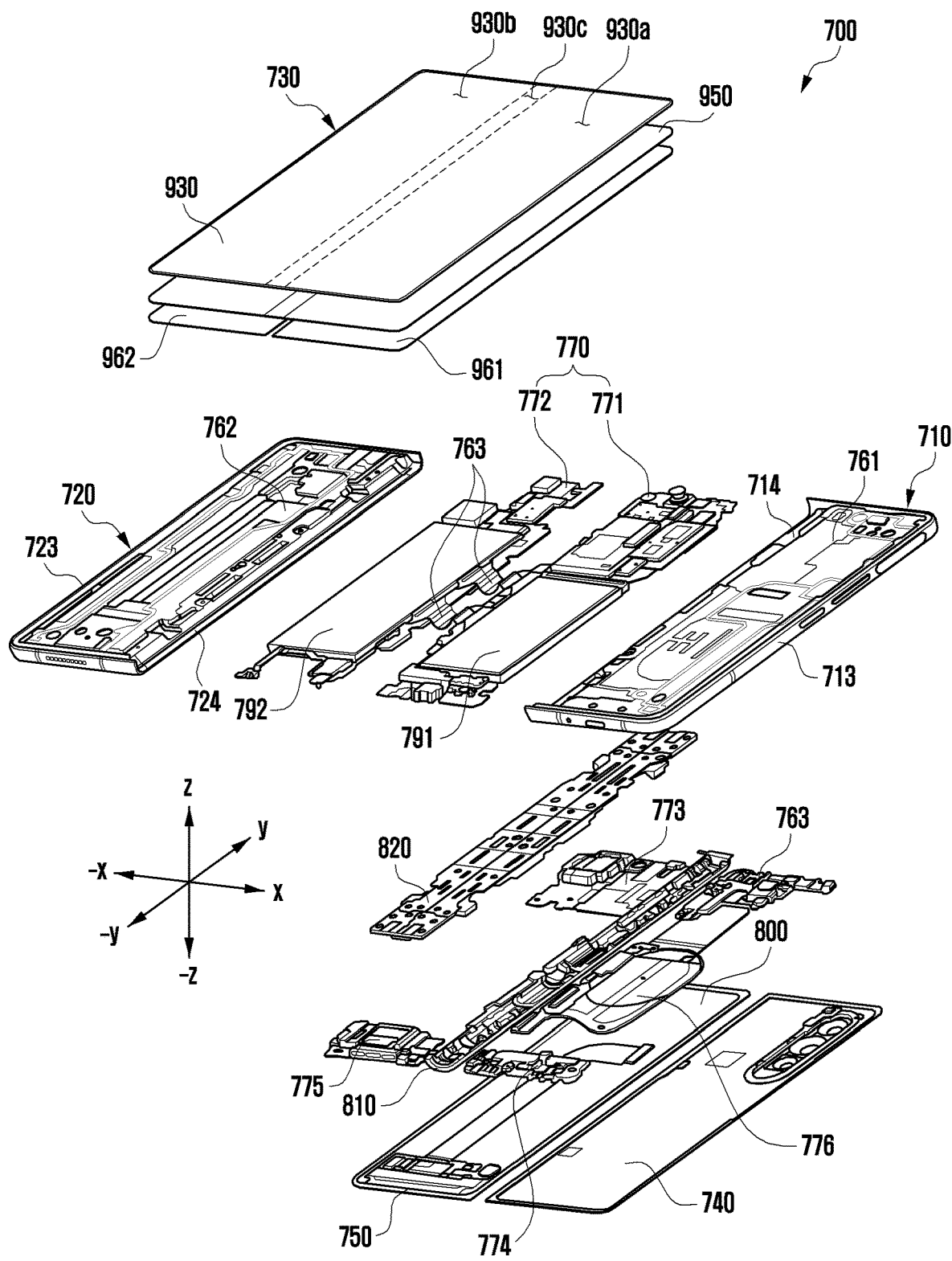
FIG. 8E is an exploded perspective view of an electronic device according to another embodiment.

FIGS. 8A and 8B are views viewed from the front and rear of an electronic device 700 in an unfolded state according to another embodiment. FIGS. 8C and 8D are views viewed from the front and rear of an electronic device 700 in a folded state according to another embodiment. FIG. 8E is an exploded perspective view of an electronic device 700 according to another embodiment.

The components described with reference to FIGS. 2A to 7C may be applied to the electronic device 700 according to another exemplary embodiment illustrated in FIGS. 8A to 8E. In the following description, the same reference numerals are used for the same or similar components as those described with reference to FIGS. 2A to 7C, and detailed descriptions thereof will be omitted.

Referring to FIGS. 8A to 8D, an electronic device 700 may include a pair of housings 710 and 720 (e.g., a foldable housing structure) rotatably coupled to each other with reference to folding axis A through a hinge device (e.g., a hinge device 320 of FIG. 3) (e.g., a hinge module) so as to be folded with respect to each other, a first display 730 (e.g., a flexible display, a foldable display, or a main display) disposed through the pair of housings 710 and 720, and/or a second display 800 (e.g., a sub display) disposed through the second housing 720. According to an embodiment, at least a part of the hinge device (e.g., the hinge device 320 of FIG. 3) may be disposed so as not to be viewed from the outside through the first housing 710 and the second housing 720, and may be disposed so as not to be viewed from the outside through the hinge housing 810 covering a foldable portion. According to an embodiment, the hinge device 320 may include a hinge module including a gear assembly including multiple gears and multiple hinge cams which are coupled to hinge shafts rotating through the gear assembly and perform a cam interlocking operation, and hinge plates for connecting the hinge model to the first housing 710 and the second housing 720. In the disclosure, a surface in which the first display 730 is disposed may be defined as a front surface of the electronic device 700, and a surface opposite to the front surface may be defined as a rear surface of the electronic device 700. In addition, a surface surrounding a space between the front surface and the rear surface may be defined as a side surface of the electronic device 700.

According to various embodiments, the pair of housings 710 and 720 may include a first housing 710 and a second housing 720 foldably arranged with respect to each other through the hinge device (e.g., the hinge device 320 of FIG. 3). According to an embodiment, the shape and the coupling of the pair of housings 710 and 720 are not limited to those illustrated in FIGS. 8A to 8C, and the pair of housings 710 and 720 may be implemented by a combination and/or coupling of other shapes or components. According to an embodiment, the first housing 710 and the second housing 720 may be arranged on opposite sides with reference to the folding axis A, and may have shapes that are entirely symmetric to each other with respect to the folding axis A. According to an embodiment, the first housing 710 and the second housing 720 may be asymmetrically folded with reference to the folding axis A. According to an embodiment, the angle or the distance between the first housing 710 and the second housing 720 may vary depending on whether the electronic device 700 is in an unfolded state, a folded state, or an intermediate state.

According to various embodiments, the first housing 710 may include, in the unfolded state of the electronic device 700, a first surface 711 connected to the hinge device (e.g., the hinge device 320 of FIG. 3) and disposed to be oriented to the front surface of the electronic device 700, a second surface 712 oriented in a direction opposite to the first surface 711, and/or a first side member 713 surrounding at least a part of a first space between the first surface 711 and the second surface 712. According to an embodiment, the second housing 720 may include, in the unfolded state of the electronic device 700, a third surface 721 connected to the hinge device (e.g., the hinge device 320 of FIG. 3) and disposed to be oriented to the front surface of the electronic device 700, a fourth surface 722 oriented in a direction opposite to the third surface 721, and/or a second side member 723 surrounding at least a part of a second space between the third surface 721 and the fourth surface 722. According to an embodiment, the first surface 711 and the third surface 721 may be oriented in substantially the same direction in the unfolded state, and the first surface 711 and the third surface 721 may at least partially face each other in the folded state. According to an embodiment, the electronic device 700 may include a recess 701 (see e.g., FIG. 8A) formed to receive the first display 730 through structural coupling of the first housing 710 and the second housing 720. According to an embodiment, the recess 701 may have substantially the same shape as the first display 730. According to an embodiment, the first housing 710 may include a first protection frame 713*a* (e.g., a first decoration member) which is, when viewed from above the first display 730, coupled to the first side member 713, disposed to overlap with an edge of the first display 730, so as to cover the edge of the first display 730 to allow the same not to be viewed from the outside. According to an embodiment, the first protection frame 713*a* may be integrally formed with the first side member 713. According to an embodiment, the second housing 720 may include a second protection frame 723*a* (e.g., a second decoration member) which is, when viewed from above the first display 730, coupled to the second side member 723, disposed to overlap with an edge of the first display 730, so as to cover the edge of the first display 730 to allow the same not to be viewed from the outside. According to an embodiment, the second protection frame 723*a* may be integrally formed with the first side member 723. In an embodiment, the first protection frame 713*a* and the second protection frame 723*a* may be omitted.

According to various embodiments, the hinge housing 810 (e.g., a hinge cover) may be disposed between the first housing 710 and the second housing 720, and may be disposed to cover a part (e.g., at least one hinge module) of the hinge device (e.g., the hinge device 320 of FIG. 3) disposed on the hinge housing 810. According to an embodiment, the hinge housing 810 may be hidden or exposed from or to the outside by a part of the first housing 710 and the second housing 720 according to the unfolded state, the folded state, or the intermediate state of the electronic device 700. For example, when the electronic device 700 is in the unfolded state, at least a part of the hinge housing 810 may be covered by the first housing 710 and the second housing 720 and not be substantially exposed. According to an embodiment, when the electronic device 700 is in the folded state, at least a part of the hinge housing 810 may be exposed to the outside between the first housing 710 and the second housing 720. According to an embodiment, in the intermediate state in which the first housing 710 and the second housing 720 are folded with each other by a predetermined angle (folded with a certain angle), the hinge housing 810 may be at least partially exposed to the outside of the electronic device 700 between the first housing 710 and the second housing 720. For example, an area in which the hinge housing 810 is exposed to the outside, may be smaller than that in a case in which the electronic device 700 is completely folded. According to an embodiment, the hinge housing 810 may include a curved surface.

According to various embodiments, when the electronic device 700 is in the unfolded state (e.g., the states shown in FIGS. 8A and 8B), the first housing 710 and the second housing 720 may meet at an about 180-degree angle, and a first area 730*a*, a second area 730*b*, and a folding area 730*c* of the first display 730 may form the same plane and arranged to be oriented in substantially the same direction (e.g., a z-axis direction). In another embodiment, when the electronic device 700 is in the unfolded state, the first housing 710 may rotate by an about 360-degree angle with respect to the second housing 720, and may be outwardly folded (an out-folding scheme) so that the second surface 712 and the fourth surface 722 face each other.

According to various embodiments, when the electronic device 700 is in the folded state (e.g., the states shown in FIGS. 8C and 8D), the first surface 711 of the first housing 710 and the third surface 721 of the second housing 720 may be arranged to face each other. In this case, the first area 730*a* and the second area 730*b* of the first display 730 may form a narrow angle (e.g., a range between 0 degree to about 10 degrees) through the folding area 730*c*, and may be arranged to face each other. According to an embodiment, at least a part of the folding area 730*c* may be deformed into a curved shape having a predetermined curvature. According to an embodiment, when the electronic device 700 is in the intermediate state, the first housing 710 and the second housing 720 may be arranged at a predetermined angle (a certain angle). In this case, the first area 730*a* and the second area 730*b* of the first display 730 may form an angle that is greater than that in the folded state and smaller than that in the unfolded state, and the curvature of the folding area 730*c* may be lower than that in the folded state, and may be higher than that in the unfolded state. In an embodiment, the first housing 710 and the second housing 720 may form an angle which allows stopping at a designated folding angle between the folded state and the unfolded state (a free stop function), through the hinge device (e.g., the hinge device 320 of FIG. 3). In an embodiment, the first housing 710 and the second housing 720 may continuously operate while being pressed in an unfolding direction or a folding direction with reference to a designated inflection angle, through the hinge device (e.g., the hinge device 320 of FIG. 3).

According to various embodiments, the electronic device 700 may include at least one of at least one display 730 and 800 disposed on the first housing 710 and/or the second housing 720, an input device 715, sound output devices 727 and 728, sensor modules 717*a*, 717*b*, and 726, camera modules 716*a*, 716*b*, and 725, a key input device 719, an indicator (not shown), or a connector port 729. In an embodiment, the electronic device 700 may omit at least one of the elements, or may additionally include at least one another element.

According to various embodiments, the at least one display 730 and 800 may include a first display 730 (e.g., a flexible display) disposed to be supported by the third surface 721 of the second housing 720 from the first surface 711 of the first housing 710 through the hinge device (e.g., the hinge device 320 of FIG. 3), and a second display 800 disposed to be at least partially viewed from the outside through the fourth surface 722 in a space in the second housing 720. In an embodiment, the second display 800 may be disposed to be viewed from the outside through the second surface 712 in a space in the first housing 710. According to an embodiment, the first display 730 may be mainly used in the unfolded state of the electronic device 700, and the second display 800 may be mainly used in the folded state of the electronic device 700. According to an embodiment, the electronic device 700 may control, in the intermediate state, the first display 730 and/or the second display 800 to be used, based on a folding angle between the first housing 710 and the second housing 720.

According to various embodiments, the first display 730 may be disposed in a receiving space formed by the pair of housings 710 and 720. For example, the first display 700 may be disposed in a recess 701 formed by the pair of housings 710 and 720, and may be disposed to occupy substantially the most of the front surface of the electronic device 700 in the unfolded state. According to an embodiment, the first display 730 may include a flexible display having at least one area which can be deformed into a plane or a curved surface. According to an embodiment, the first display 730 may include the first area 730*a* facing the first housing 710 and the second area 730*b* facing the second housing 720. According to an embodiment, the first display 730 may include the folding area 730*c* including a part of the first area 730*a* and a part of the second area 730*b* with respect to the folding axis A. According to an embodiment, at least a part of the folding area 730*c* may include an area corresponding to the hinge device (e.g., the hinge device 320 of FIG. 3). According to an embodiment, a division of an area of the first display 730 merely corresponds to exemplary physical division by the pair of housings 710 and 720 and the hinge device (e.g., the hinge device 320 of FIG. 3), and the first display 730 may be substantially displayed as one seamless full screen through the pair of the housings 710 and 720 and the hinge device (e.g., the hinge device 320 of FIG. 3). According to an embodiment, the first area 730*a* and the second area 730*b* may have shapes that are entirely symmetric or partially asymmetric to each other with respect to the folding area 730*c*.

According to various embodiments, the electronic device 700 may include a first rear cover 740 disposed on the second surface 712 of the first housing 710 and a second rear cover 750 disposed on the fourth surface 722 of the second housing 720. In an embodiment, at least a part of the first rear cover 740 may be integrally formed with the first side member 713. In an embodiment, at least a part of the second rear cover 750 may be integrally formed with the second side member 723. According to an embodiment, at least one of the first rear cover 740 and the second rear cover 750 may be substantially formed of a transparent plate (e.g., a polymer plate or glass plate including various coding layers) or an opaque plate. According to an embodiment, the first rear cover 740 may be formed of, for example, an opaque plate such as coded or colored glass, ceramic, polymer, metal (e.g., aluminum, stainless steel (STS), or magnesium), or a combination of at least two of the materials above. According to an embodiment, the second rear cover 750 may be substantially formed of, for example, a transparent plate such as glass or polymer. Accordingly, the second display 800 may be disposed to be viewed from the outside through the second rear cover 750 in a space in the second housing 720.

According to various embodiments, the input device 715 may include a microphone. In an embodiment, the input device 715 may include multiple microphones arranged to detect the direction of sound. According to an embodiment, the sound output devices 727 and 728 may include speakers. According to an embodiment, the sound output devices 727 and 728 may include a call receiver 727 disposed through the fourth surface 722 of the second housing 720 and an external speaker 728 disposed through at least a part of the second side member 723 of the second housing 720. In an embodiment, the input device 715, the sound output devices 727 and 728, and the connector 729 may be disposed in spaces of the first housing 710 and/or the second housing 720, and may be exposed to an external environment through at least one hole formed through the first housing 710 and/or the second housing 720. In an embodiment, holes formed through the first housing 710 and/or the second housing 720 may be commonly used for the input device 715 and the sound output devices 727 and 728. In an embodiment, the sound output devices 727 and 728 may include a speaker (e.g., a piezo speaker) operating without including a hole formed through the first housing 710 and/or the second housing 720.

According to various embodiments, the camera modules 716a, 716b, and 725 may include a first camera module 716a disposed on the first surface 711 of the first housing 710, a second camera module 716b disposed on the second surface 712 of the first housing 710, and/or a third camera module 725 disposed on the fourth surface 722 of the second housing 720. According to an embodiment, the electronic device 700 may include a flash 718 disposed around the second camera module 716b. According to an embodiment, the flash 718 may include, for example, a light-emitting diode or a xenon lamp. According to an embodiment, the camera modules 716a, 716b, and 725 may include one or multiple lenses, an image sensor, and/or an image signal processor. In an embodiment, at least one of the camera modules 716a, 716b, and 725 may include two or more lenses (e.g., wide-angle and telephoto lenses) and image sensors, and may be arranged together on one surface of the first housing 710 and/or the second housing 720.

According to various embodiments, the sensor modules 717a, 717b, and 726 may generate a data value or an electrical signal corresponding to an internal operational state or an external environmental state of the electronic device 700. According to an embodiment, the sensor modules 717a, 717b, and 726 may include a first sensor module 717a disposed on the first surface 711 of the first housing 710, a second sensor module 717b disposed on the second surface 712 of the first housing 710, and/or a third sensor module 726 disposed on the fourth surface 722 of the second housing 720. In an embodiment, the sensor modules 717a, 717b, and 726 may include at least one of a gesture sensor, a grip sensor, a color sensor, an infrared (IR) sensor, an illuminance sensor, an ultrasonic sensor, an iris recognition sensor, or a distance detection sensor (e.g., a time of flight (TOF) sensor or a light detection and ranging (LiDAR)).

According to various embodiments, the electronic device 700 may further include an unillustrated sensor module, for example, at least one of an atmospheric sensor, a magnetic sensor, a biometric sensor, a temperature sensor, a humidity sensor, or a fingerprint recognition sensor. In an embodiment, the fingerprint recognition sensor may be disposed through at least one of the first side member 713 of the first housing 710 and/or the second side member 723 of the second housing 720.

According to various embodiments, the key input device 719 may be disposed to be exposed to the outside through the first side member 713 of the first housing 710. In an embodiment, the key input device 719 may be disposed to be exposed to the outside through the second side member 723 of the second housing 720. In an embodiment, the electronic device 700 may not include some or all of the key input device 719, and the unincluded key input device 719 may be implemented in another shape such as a soft key on the least one display 730 and 800. In another embodiment, the key input device 719 may be implemented by using a pressure sensor included in the at least one display 730 and 800.

According to various embodiments, the connector port 729 may include a connector (e.g., a USB connector or an IF module (an interface connector port module)) for transmitting or receiving data and/or power to and/or from an external electronic device. In an embodiment, the connector port 729 may perform a function of transmitting or receiving an audio signal to or from the external electronic device together, or may further include a separate connector port (e.g., an ear jack hole) for performing a function of transmitting or receiving an audio signal to or from the external electronic device.

According to various embodiments, at least one camera modules 716a and 725 of the camera modules 716a, 716b, and 725, at least one sensor module 717a and 726 of the sensor modules 717a, 717b, and 726, and/or an indicator may be arranged to be exposed through the at least one display 730 and 800. For example, the at least one camera modules 716a and 725, the at least one sensor module 717a and 726, and/or the indicator may be arranged under an activated area (a display area) of the at least one display 730 and 800 in a space in the at least one housing 710 and 720, and may be arranged to come into contact with an external environment through a transparent area or an opening that is perforated to a cover member (e.g., a window layer (not shown) of the first display 730 and/or the second rear cover 750). According to an embodiment, an area in which the at least one display 730 and 800 and the at least one camera module 716a and 725 face each other may be formed as a transmission area having a predetermined transmission ratio, as a part of an area in which a content is displayed. According to an embodiment, the transmission area may be formed to have a transmission ratio in the range of about 5% to about 20%. The transmission area may include an area overlapping with an effective area (e.g., an angle of view area) of the at least one camera module 716a and 725, wherein an image is formed on the image sensor in the effective area, and light for generating an image passes through the effective area. For example, the transmission area of the display 730 and 800 may include an area in which the density of a pixel is lower than that in a surrounding area. For example, the transmission area may be replaced with an opening. For example, the at least one camera module 716a and 725 may include an under-display camera (UDC) or an under-panel camera (UPC). In another embodiment, some camera modules or sensor modules 271a and 726 may be arranged to perform functions thereof without being visually exposed through the display. For example, an area facing the sensor module 717a and 726 and/or the camera module 716a and 725 arranged under the display 730 and 800 (e.g., a display panel) corresponds to an under-display camera (UDC) structure, and a perforated opening is not necessarily required.

Referring to FIG. 8E, an electronic device 700 may include a first display 730 (e.g., a flexible display module), a second display 800, a hinge device 820, a pair of support members 761 and 762, at least one substrate 770 (e.g., a printed circuit board (PCB)), a first housing 710, a second housing 720, a first back cover 740, and/or a second back cover 750.

According to various embodiments, the first display 730 may include a display panel 930 (e.g., a flexible display module panel), a support plate 950 disposed under the display panel 930, and a pair of reinforcing plates 961 and 962 disposed under the support plate 950. According to an embodiment, the display panel 930 may include a first panel region 930a corresponding to a first region (e.g., a first region 730a of FIG. 8A) of the first display 730, a second panel region 930b extending from the first panel region 930a and corresponding to a second region (e.g., a second region 730b of FIG. 8A) of the first display 730, and a third panel region 930c which connects the first panel region 930a and the second panel region 930b and corresponds to a folding region (e.g., a folding region 730c of FIG. 8A) of the first display 730. According to an embodiment, the support plate 950 may be disposed between the display panel 930 and the pair of support members 761 and 762, and formed to have a material and a shape for providing a planar support structure for the first panel region 930a and the second panel region 930b and a bendable structure for aiding in flexibility in the third panel region 930c. According to an embodiment, the support plate 950 may be formed of a conductive material (e.g., metal) or a non-conductive material (e.g., polymer or fiber reinforced plastics (FRP)). According to an embodiment, the pair of reinforcing plates 961 and 962 may include, between the support plate 950 and the pair of support members 761 and 762, a first reinforcing plate 961 disposed to correspond to at least a part of the first panel region 930a and the third panel region 930c, and a second reinforcing plate 962 disposed to correspond to at least a part of the second panel region 930b and the third panel region 930c. According to an embodiment, the pair of reinforcing plates 961 and 962 may be formed of a metal material (e.g., stainless steel, (SUS)) so as to help reinforce rigidity and a ground connection structure for the first display 730.

According to various embodiments, the second display 800 may be disposed in a space between the second housing 720 and the second back cover 750. According to an embodiment, the second display 800 may be arranged to be visible from the outside through substantially the entire area of the second back cover 750, in the space between the second housing 720 and the second back cover 750.

According to various embodiments, at least a part of a first support member 761 may be foldably coupled to a second support member 762 through the hinge device 820. According to an embodiment, the electronic device 700 may include at least one wiring member 763 (e.g., a flexible printed circuit board (FPCB)) disposed from at least a part of the first support member 761 across the hinge device 820 to a part of the second support member 762. According to an embodiment, the first support member 761 may extend from a first side housing 713 or may be disposed in a manner that is structurally coupled to the first side housing 713. According to an embodiment, the electronic device 700 may include a first space (e.g., a first space 7101 of FIG. 8A) provided through the first support member 761 and the first back cover 740. According to an embodiment, the first housing 710 (e.g., a first housing structure) may be configured through the coupling of the first side housing 713, the first support member 761, and the first back cover 740. According to an embodiment, the second support member 762 may extend from a second side housing 723 or may be disposed in a manner that is structurally coupled to the second side housing 723. According to an embodiment, the electronic device 700 may include a second space (e.g., a second space 7201 of FIG. 8A) provided through the second support member 762 and the second back cover 750. According to an embodiment, the second housing 720 (e.g., a second housing structure) may be configured through the coupling of the second side housing 723, the second support member 762, and the second back cover 750. According to an embodiment, at least a part of the at least one wiring member 763 and/or the hinge device 820 may be disposed to be supported through at least a part of the pair of support members 761 and 762. According to an embodiment, the at least one wiring member 763 may be disposed in a direction (e.g., the x-axis direction) crossing the first support member 761 and the second support member 762. According to an embodiment, the at least one wiring member 763 may be disposed in a direction (e.g., the x-axis direction) substantially perpendicular to a folding axis (e.g., the y-axis or a folding axis A of FIG. 8A).

According to various embodiments, the at least one substrate 770 may include a first substrate 771 disposed in the first space 7101 and a second substrate 772 disposed in the second space 7201. According to an embodiment, the first substrate 771 and the second substrate 772 may include a plurality of electronic components arranged to implement various functions of the electronic device 700. According to an embodiment, the first substrate 771 and the second substrate 772 may be electrically connected through the at least one wiring member 763.

According to various embodiments, the electronic device 700 may include at least one battery 791 and 792. According to an embodiment, the at least one battery 791 and 792 may include a first battery 791 disposed in the first space 7101 of the first housing 710 and electrically connected to the first substrate 771, and a second battery (792) disposed in the second space 7201 of the second housing 720 and electrically connected to the second substrate 772. According to an embodiment, the first support member 761 and the second support member 762 may further include at least one swelling hole for the first battery 791 and the second battery 792.

According to various embodiments, the first housing 710 may include a first rotation support surface 714, and the second housing 720 may include a second rotation support surface 724 corresponding to the first rotation support surface 714. According to an embodiment, the first rotation support surface 714 and the second rotation support surface 724 may include a curved surface corresponding to (naturally connected to) a curved outer surface of a hinge housing 810. According to an embodiment, when the electronic device 700 is in an unfolded state, the first rotation support surface 714 and the second rotation support surface 724 cover the hinge housing 810, so that the hinge housing 810 may not be exposed to a rear surface of the electronic device 700 or may be partially exposed. According to an embodiment, when the electronic device 700 is in a folded state, the first rotation support surface 714 and the second rotation support surface 724 may rotate along the curved outer surface of the hinge housing 810 to expose at least a part of the hinge housing 810 to the rear surface of the electronic device 700.

According to various embodiments, the electronic device 700 may include at least one antenna 776 disposed in the first space 7101. According to an embodiment, the at least one antenna 776 may be disposed at the first battery 791 and the first back cover 740 in the first space 7101. According to an embodiment, the at least one antenna 776 may include, for example, a near field communication (NFC) antenna, a wireless charging antenna, and/or a magnetic secure transmission (MST) antenna. According to an embodiment, for example, the at least one antenna 776 may perform short-range communication with an external device, or wirelessly transmit/receive power required for charging. In some embodiments, an antenna structure may be configured by at least a part of the first side housing 713 or the second side housing 723 and/or a part of the first support member 761 and the second support member 762 or a combination thereof.

According to various embodiments, the electronic device 700 may further include at least one electronic component assembly 774 and 775 disposed in the first space 7101 and/or the second space 7201, and/or additional support members 763 and 773. For example, the at least one electronic component assembly may include an interface connector port assembly 774 or a speaker assembly 775.

In the above, the configuration of the electronic device 700 according to an embodiment different from the electronic device 200 described with reference to FIGS. 2A to 7C has been described. However, the components described with reference to FIGS. 2A to 7C may be applied to the electronic device 700 described with reference to FIGS. 8A to 8E. For example, the side housings 713 and 723 described with reference to FIGS. 8A to 8E may be configurations corresponding to the side housing 310 of FIGS. 2A to 7C. The electronic device 700 described with reference to FIGS. 8A to 8E may include the protection member 410 described with reference to FIGS. 2A to 7C. As described with reference to FIGS. 2A to 7C, the protection member 410 may be disposed to cover a part of the display module 730 (e.g., the first display 730) and the side housings 713 and 723. For example, the protection member 410 may be disposed along an edge of the display module 730. As described above, the conductive member 340 may be disposed on the protection member 410. The conductive member 340 may be disposed on the protection member 410 so as to face at least one of the first side housing 713 and the second side housing 723 in a state of being spaced apart from the same. In an embodiment, the conductive member 340 may include the second conductive member 342 facing at least one of the first side housing 713 and the second side housing 723 in a state of being spaced apart from the same. As the second conductive member 342 and the side housings 713 and 723 are positioned to be spaced apart from each other, a capacitance (C) may be configured between the second conductive member 342 and the side housings 713 and 723.

In various embodiments disclosed herein, the side housings 713 and 723 of the electronic device 700 may be connected to an antenna IC included in the electronic device 700 to function as an antenna. As shown in FIG. 4A, as the second conductive member 342 disposed on the protection member 410 and the side housings 713 and 723 of the electronic device 700 are spaced apart from each other by a predetermined distance (D), a capacitance (C) may be configured between the side housings 713 and 723 and the second conductive member 342. For example, a predetermined distance (D) exists between the second conductive member 342 and the side housings 713 and 723 and an overlapping region (A) in which the second conductive member 342 and the side housings 713 and 723 face each other exists, so that a capacitance (C) may be generated in the electronic device 700 by the second conductive member 342, the side housings 713 and 723, and a separation space 930. The capacitance (C) may be used to adjust impedance of an antenna. By adjusting the impedance of the antenna through the capacitance (C), the antenna performance of the electronic device 700 may be improved. In the above, although a relationship between the side housings 713 and 723 and the second conductive member 342 has been described, this may be a description of a relationship between the first side housing 713 or the second side housing 723 and the second conductive member 342, and may be a description of a relationship between the first side housing 713 and the second conductive member 342 and a relationship between the second side housing 723 and the second conductive member 342.

An electronic device 200 (e.g., the electronic device 101 of FIG. 1) according to various embodiments disclosed herein may include a display module (e.g., the display module 160 of FIG. 1, the display module 230 of FIG. 2A, or the first display 730 of FIG. 8A), a side housing (e.g., the side housing 310 of FIG. 2A, the first side housing 713 of FIG. 8A, or the second side housing 723 of FIG. 8A) disposed to surround a side surface of the display module and formed of a conductive material, a protection member 410 disposed to cover a part of the side housing and the display module, and including a first portion 411 facing the display module and a second portion 412 facing the side housing, a first conductive member 341 disposed in at least a part of the first portion of the protection member and formed of a conductive material, a second conductive member 342 disposed in at least a part of the second portion of the protection member, connected to the first conductive member, and formed of a conductive material, a separation space 430 disposed between the second conductive member and the side housing, and an antenna (e.g., the antenna module 197) electrically connected to the side housing such that the side housing functions as the antenna, or at least a portion of the antenna.

In addition, a flow of electric charge may be induced from the protection member to the side housing by the first conductive member and the second conductive member.

In addition, the side housing may be electrically connected to at least one ground included in the electronic device.

In addition, the electronic device may further include a dielectric material 440 disposed in the separation space disposed between the second conductive member and the side housing.

In addition, the protection member may include a partition wall portion 413 disposed between the side housing and the display module so as to be spaced apart from the side housing, and the partition wall portion may be positioned in the separation space disposed between the second conductive member and the side housing.

In addition, the second conductive member may be electrically connected to the side housing to function as an antenna.

In addition, a capacitance (C) may be added to the antenna by the side housing, the second conductive member, and the separation space.

In addition, the capacitance may be adjusted according to a size of the separation space disposed between the second conductive member and the side housing.

In addition, the capacitance may be adjusted according to an area of a region (e.g., the overlapping region (A) of FIG. 4A) where the second conductive member and the side housing face each other.

In addition, the side housing may include a segment portion (e.g., the first segment portion 320 of FIG. 3) disposed in the side housing such that the side housing is segmented into a plurality of parts, and the first conductive member and the second conductive member may be disposed at the side housing so as to correspond to the segmented side housing.

In addition, the electronic device may further include an insulating member (e.g., the first insulating member 330 of FIG. 3) formed of an insulating material and filled in the segment portion disposed in the side housing.

An antenna structure of an electronic device 200 (e.g., the electronic device 101 of FIG. 1) including a side housing (e.g., the side housing 310 of FIG. 2A, the first side housing 713 of FIG. 8A, or the second side housing 723 of FIG. 8A)

configuring an exterior of the electronic device according to various embodiments disclosed herein may include an antenna IC connected to the side housing, a conductive member 340 disposed on a protection member 410 of the electronic device and formed of a conductive material, the protection member covering a part of the side housing, and a separation space 430 disposed between the side housing and the conductive member.

In addition, the protection member may include a first portion 411 facing a display module (e.g., the display module 160 of FIG. 1, the display module 230 of FIG. 2A, or the first display 730 of FIG. 8A) of the electronic device, and a second portion 412 facing the side housing, and the conductive member may include a first conductive member 341 disposed in at least a part of the first portion of the protection member, and a second conductive member 342 disposed in at least a part of the second portion of the protection member.

In addition, a flow of electric charge may be induced from the protection member to the side housing by the conductive member.

In addition, the side housing may be electrically connected to at least one ground included in the electronic device.

In addition, the antenna structure may further include a dielectric material 440 disposed in the separation space disposed between the conductive member and the side housing.

In addition, the side housing may be disposed to surround the display module of the electronic device, and the dielectric material may be a partition wall portion 413 extending from the protection member and positioned between the display module and the side housing.

In addition, the conductive member may be electrically connected to the side housing to function as an antenna.

In addition, a capacitance (C) may be added to an antenna of the electronic device connected to the antenna IC by the side housing, the conductive member, and the separation space, and the capacitance may be adjusted according to a size of the separation space disposed between the conductive member and the side housing.

In addition, a capacitance (C) may be added to an antenna of the electronic device connected to the antenna IC by the side housing, the conductive member, and the separation space, and the capacitance may be adjusted according to an area of a region (e.g., the overlapping region (A) of FIG. 4A) where the conductive member and the side housing face each other.

In addition, the embodiments disclosed in this document disclosed in the specification and drawings are provided only to provide a specific example in order to easily describe the technical content according to the embodiment disclosed in this document and to help understanding of the embodiment disclosed in this document, and are not intended to limit the scope of the embodiment disclosed in this document. Therefore, the scope of various embodiments disclosed in this document should be interpreted to include all changes or modified forms derived based on the technical spirit of various embodiments disclosed in this document in addition to the embodiments disclosed herein.

The invention claimed is:

1. An electronic device comprising:
 a display module;
 a side housing disposed to surround a side surface of the display module and formed of a conductive material;
 a protection member disposed to cover a part of the side housing and the display module, and comprising a first portion facing the display module and a second portion facing the side housing;
 a first conductive member disposed in at least a part of the first portion of the protection member and formed of a conductive material;
 a second conductive member disposed in at least a part of the second portion of the protection member, connected to the first conductive member, and formed of a conductive material;
 a separation space disposed between the second conductive member and the side housing; and
 an antenna electrically connected to the side housing such that the side housing functions as at least a portion of the antenna.

2. The electronic device of claim 1, wherein a flow of electric charge is induced from the protection member to the side housing by the first conductive member and the second conductive member.

3. The electronic device of claim 1, wherein the side housing is electrically connected to at least one ground included in the electronic device.

4. The electronic device of claim 1, further comprising a dielectric material disposed in the separation space disposed between the second conductive member and the side housing.

5. The electronic device of claim 1, wherein the protection member comprises a partition wall portion disposed between the side housing and the display module so as to be spaced apart from the side housing, and
 wherein the partition wall portion is positioned in the separation space disposed between the second conductive member and the side housing.

6. The electronic device of claim 1, wherein the second conductive member is electrically connected to the side housing to function as at least a portion of the antenna.

7. The electronic device of claim 1, wherein a capacitance is added to the antenna by the side housing, the second conductive member, and the separation space.

8. The electronic device of claim 7, wherein the capacitance is adjusted according to a size of the separation space disposed between the second conductive member and the side housing.

9. The electronic device of claim 7, wherein the capacitance is adjusted according to an area of a region where the second conductive member and the side housing face each other.

10. The electronic device of claim 1, wherein the side housing comprises a segment portion disposed in the side housing such that the side housing is segmented into a plurality of parts, and
 wherein the first conductive member and the second conductive member are disposed at the side housing so as to correspond to the segmented side housing.

11. The electronic device of claim 10, further comprising an insulating member formed of an insulating material and filled in the segment portion disposed in the side housing.

12. An antenna structure of an electronic device comprising a side housing configuring an exterior of the electronic device, the antenna structure comprising:
 an antenna IC connected to the side housing;
 a conductive member disposed on a protection member of the electronic device and formed of a conductive material, the protection member covering a part of the side housing; and a separation space disposed between the side housing and the conductive member.

13. The antenna structure of claim 12, wherein the protection member comprises
a first portion facing a display module of the electronic device, and a second portion facing the side housing, and
wherein the conductive member comprises:
a first conductive member disposed in at least a part of the first portion of the protection member, and a second conductive member disposed in at least a part of the second portion of the protection member.

14. The antenna structure of claim 12, wherein a flow of electric charge is induced from the protection member to the side housing by the conductive member.

15. The antenna structure of claim 12, wherein the side housing is electrically connected to at least one ground included in the electronic device.

16. The antenna structure of claim 12, further comprising a dielectric material disposed in the separation space disposed between the conductive member and the side housing.

17. The antenna structure of claim 16, wherein the side housing is disposed to surround a display module of the electronic device, and
wherein the dielectric material is a partition wall portion extending from the protection member and positioned between the display module and the side housing.

18. The antenna structure of claim 12, wherein the conductive member is electrically connected to the side housing to function as an antenna.

19. The antenna structure of claim 12, wherein a capacitance is added to an antenna of the electronic device connected to the antenna IC by the side housing, the conductive member, and the separation space, and
wherein the capacitance is adjusted according to a size of the separation space disposed between the conductive member and the side housing.

20. The antenna structure of claim 12, wherein a capacitance is added to an antenna of the electronic device connected to the antenna IC by the side housing, the conductive member, and the separation space, and
wherein the capacitance is adjusted according to an area of a region where the conductive member and the side housing face each other.

* * * * *